(12) United States Patent
Bizoara et al.

(10) Patent No.: US 11,967,145 B2
(45) Date of Patent: Apr. 23, 2024

(54) APPARATUSES, METHODS, AND COMPUTER PROGRAM PRODUCTS FOR AUTOMATIC PROOF OF DELIVERY USING VISUAL INDICIA

(71) Applicant: Hand Held Products, Inc., Fort Mill, SC (US)

(72) Inventors: Manjul Bizoara, Charlotte, NC (US); David M Wilz, Charlotte, NC (US); Wei Zhao, Charlotte, NC (US); Jingzhe Zhang, Charlotte, NC (US)

(73) Assignee: HAND HELD PRODUCTS, INC., Charlotte, NC (US)

( * ) Notice: Subject to any disclaimer, the term of this patent is extended or adjusted under 35 U.S.C. 154(b) by 0 days.

(21) Appl. No.: 17/112,350

(22) Filed: Dec. 4, 2020

(65) Prior Publication Data

US 2021/0216950 A1     Jul. 15, 2021

(30) Foreign Application Priority Data

Dec. 4, 2019  (CN) .......................... 201911226804.2

(51) Int. Cl.
*G06V 20/00*     (2022.01)
*G06Q 10/087*    (2023.01)
(Continued)

(52) U.S. Cl.
CPC ........... *G06V 20/00* (2022.01); *G06Q 10/087* (2013.01); *G06V 20/10* (2022.01); *G06V 20/52* (2022.01); *G06V 30/424* (2022.01); *H04W 4/80* (2018.02)

(58) Field of Classification Search
CPC .. G06Q 10/08; G06Q 10/083; G06Q 10/0833; H04W 4/80
See application file for complete search history.

(56) References Cited

U.S. PATENT DOCUMENTS 5,821,523 A * 10/1998 Bunte ................ G06K 7/10881
                                                   235/472.01
10,389,983 B1 * 8/2019 Fu .......................... H04N 7/185
(Continued)

FOREIGN PATENT DOCUMENTS

CN         103068495 A      4/2013
CN         107077810 A      8/2017
(Continued)

OTHER PUBLICATIONS

European Search Report and Search Opinion Received for EP Application No. 20211654.7, dated May 3, 2021, 10 pages.
(Continued)

*Primary Examiner* — Wen W Huang
(74) *Attorney, Agent, or Firm* — Alston & Bird LLP

(57) ABSTRACT

Embodiments described include apparatuses, computer program products, and methods for automatic proof of delivery, for example by capturing and decoding a visual indicia. Some embodiments minimize possibilities of errors, false proof, and/or the like in item delivery. At least one embodiment enables automatic proof of delivery in a multi-sensor environment. Example embodiments are configured for capturing an image data object set utilizing at least one of an image sensor set, where the image data object set includes a captured-indicia image data object including a visual indicia; decoding the visual indicia to identify delivery information; identifying a delivery proof image data object from the image data object set; and processing the delivery proof image data object for use as a proof of delivery. Some embodiments include a near-field image sensor for capturing the delivery proof image data object and a far-field sensor for capturing the captured-indicia image data object.

20 Claims, 11 Drawing Sheets

(51) Int. Cl.
*G06V 20/10* (2022.01)
*G06V 20/52* (2022.01)
*G06V 30/424* (2022.01)
*H04W 4/80* (2018.01)

(56) References Cited

U.S. PATENT DOCUMENTS

| | | | |
|---|---|---|---|
| 2004/0148295 A1* | 7/2004 | Stevens | G07B 17/00733 |
| 2005/0006470 A1 | 1/2005 | Mrozik et al. | |
| 2009/0127327 A1* | 5/2009 | Rani | G06Q 10/08 235/375 |
| 2012/0196649 A1* | 8/2012 | Havens | H04N 5/2258 455/556.1 |
| 2012/0255375 A1 | 10/2012 | Kwok et al. | |
| 2012/0286043 A1* | 11/2012 | Leonardi | G06K 7/10732 235/440 |
| 2013/0024326 A1* | 1/2013 | Dearing | G06Q 30/0601 382/101 |
| 2013/0146656 A1 | 6/2013 | Wilke et al. | |
| 2015/0186842 A1* | 7/2015 | Daniarov | G06Q 10/0838 705/341 |
| 2015/0302495 A1* | 10/2015 | Stuckman | G06Q 10/0835 705/26.35 |
| 2016/0171438 A1 | 6/2016 | Ladden et al. | |
| 2016/0171439 A1* | 6/2016 | Ladden | G06T 7/0004 705/340 |
| 2017/0200197 A1 | 7/2017 | Brubaker | |
| 2017/0293883 A1* | 10/2017 | Li | H04L 51/046 |
| 2018/0177319 A1* | 6/2018 | Willis | A47G 29/141 |
| 2018/0197139 A1* | 7/2018 | Hill | G06T 7/0004 |
| 2019/0043326 A1* | 2/2019 | Madden | G08B 25/08 |
| 2019/0080125 A1* | 3/2019 | Ogawa | G06K 7/10722 |
| 2019/0130140 A1 | 5/2019 | Kuchenbrod et al. | |
| 2019/0286858 A1* | 9/2019 | Kuchenbrod | G06K 7/10831 |

FOREIGN PATENT DOCUMENTS

| | | |
|---|---|---|
| CN | 111295662 A | 6/2020 |
| EP | 2413293 A1 | 2/2012 |
| WO | 2016/147018 A1 | 9/2016 |
| WO | 2018/165590 A1 | 9/2018 |

OTHER PUBLICATIONS

Extended European Search Report issued in European Application No. 20188262.8 dated Dec. 8, 2020, 5 pages.
Notice of Allowance received for U.S. Appl. No. 17/028,635, dated Apr. 15, 2022, 4 pages.
EP Office Action dated Feb. 8, 2023 for EP Application No. 20211654.
Notice of Allowance received for Chinese Patent Application No. 202010767051.2, dated Mar. 17, 2022, 6 pages (2 pages of English Translation and 4 pages of Original Document).
CN Office Action Mailed on Sep. 26, 2023 for CN Application No. 201911226804, 8 page(s).
Decision to grant a European patent Mailed on Sep. 7, 2023 for EP Application No. 20188262, 2 page(s).

* cited by examiner

APPARATUSES, METHODS, AND COMPUTER PROGRAM PRODUCTS FOR AUTOMATIC PROOF OF DELIVERY USING VISUAL INDICIA

TECHNOLOGICAL FIELD

Embodiments of the present disclosure generally relate to proof of delivery for item shipping, and specifically to automatic proof of delivery using visual indicia decoding in a single and/or multi-sensor environment.

BACKGROUND

Conventional shipping utilizes a variety of proof of delivery methodologies to establish the fact that an object was delivered to a destination location associated with recipient (e.g., the recipient of a shipped package). For example, as part of proof of delivery, a shipping company may require that a delivery person scan a barcode placed on an object upon delivery of the object to the destination location. Additionally, as part of proof of delivery, the shipping company may require that the delivery person take a picture of the object at the destination location, and in some circumstances manually upload the picture to a system or portal to associate the picture with the delivered object. Applicant has discovered problems with current implementations, such as systems, methods, apparatuses, and computer program products, for proof of delivery, and through applied effort, ingenuity, and innovation, Applicant has solved many of these identified problems by developing embodied in the present disclosure, which are described in detail below.

BRIEF SUMMARY

In general, embodiments of the present disclosure provided herein include systems, methods, apparatuses and computer program products for automatic proof of delivery. Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

In accordance with at least one aspect of the disclosure, an apparatus for proof of delivery is provided. The apparatus may, for example, be utilized for automatic and/or semi-automatic proof of delivery capture. In at least one example embodiment, the apparatus includes a near-field image sensor associated with a near field of view and a far-field image sensor associated with a far field of view. Further, in the at least one example apparatus, the near field of view is broader than the far field of view. Further, the at least one example apparatus further comprises a processor configured, by computer-coded instructions accessible to the processor, for example in at least one non-transitory computer-readable storage medium accessible to the processor. In the at least one example apparatus, the processor is configured to capture a captured-indicia image data object using the far-field image sensor, the captured-indicia image data object comprising a visual indicia. The processor is further configured to decode the visual indicia to identify delivery information represented by the visual indicia. The processor is further configured to capture a delivery proof image data object using the near-field image sensor. The processor is further configured to output, for processing as a proof of delivery, the delivery proof image data object, the delivery proof image data object and the captured-indicia image data object, or a combined data object generated based at least on the delivery proof image data object and the captured-indicia image data object.

Additionally or alternatively, in at least some example embodiments of the apparatus, the apparatus comprises a plurality of image sensors comprising at least the near-field image sensor and the far-field image sensor.

Additionally or alternatively, in at least some example embodiments of the apparatus, the processor is configured to output the delivery proof image data object, the delivery proof image data object and the captured-indicia image data object, or the combined data object to an external system for processing as the proof of delivery.

Additionally or alternatively, in at least some example embodiments of the apparatus, the processor is further configured to receive user input indicating a request to begin capturing using at least the far-field image sensor, and the processor is configured to capture the image data object in response to receiving the user input.

Additionally or alternatively, in at least some example embodiments of the apparatus, to output the delivery proof image data object, the delivery proof image data object and the captured-indicia image data object, or the combined data object, the processor is configured to determine an active image output mode, and in a circumstance where the active image output mode represents a combined image output mode: generate the combined image data object based on at least the captured-indicia image data object and the delivery proof image data object; and output the combined image data object; and in a circumstance where the active image output mode represents an individual image output mode: output at least the delivery proof image data object.

Additionally or alternatively, in at least some example embodiments of the apparatus, the processor further configured to cause a delivery status update in a delivery management system.

In accordance with yet another aspect of the present disclosure, a computer-implemented method for proof of delivery is provided. The example computer-implemented method is configured for implementation via various computing hardware, for example one or more processing devices in communication with one or more image sensors. In at least one embodiment, an example computer-implemented method includes capturing a captured-indicia image data object using a far-field image sensor associated with a far field of view, the captured-indicia image data object comprising a visual indicia. Further, the example computer-implemented method includes decoding the visual indicia to identify delivery information represented by the visual indicia. Further, the example computer-implemented method includes capturing a delivery proof image data object using a near-field image sensor associated with a near field of view, wherein the near field of view is broader than the far field of view. Further, the example computer-implemented method includes outputting, for processing as a proof of delivery, the delivery proof image data object, the delivery proof image data object and the captured-indicia image data object, or a combined data object generated based at least on the delivery proof image data object and the captured-indicia image data object.

Additionally or alternatively, in at least some example embodiments of the computer-implemented method, outputting the delivery proof image data object, the delivery proof image data object and the captured-indicia image data object, or the combined data object comprises outputting the delivery proof image data object, the delivery proof image data object and the captured-indicia image data object, or the combined data object to an external system for processing as the proof of delivery.

Additionally or alternatively, in at least some example embodiments of the computer-implemented method, the computer-implemented method further includes receiving user input indicating a request to begin capturing using at least the far-field image sensor, wherein capturing the image data object is in response to receiving the user input.

Additionally or alternatively, in at least some example embodiments of the computer-implemented method, the computer-implemented method further comprises causing a delivery status update in a delivery management system.

In accordance with yet another aspect of the present disclosure, one or more computer program products for proof of delivery are provided. The computer program product includes at least one non-transitory computer readable storage medium having computer program instructions stored thereon. The computer program instructions may be configured to, in execution with one or more processors and/or corresponding computing hardware, to perform any of the above computer-implemented methods described herein.

BRIEF DESCRIPTION OF THE DRAWINGS

Figure 1:
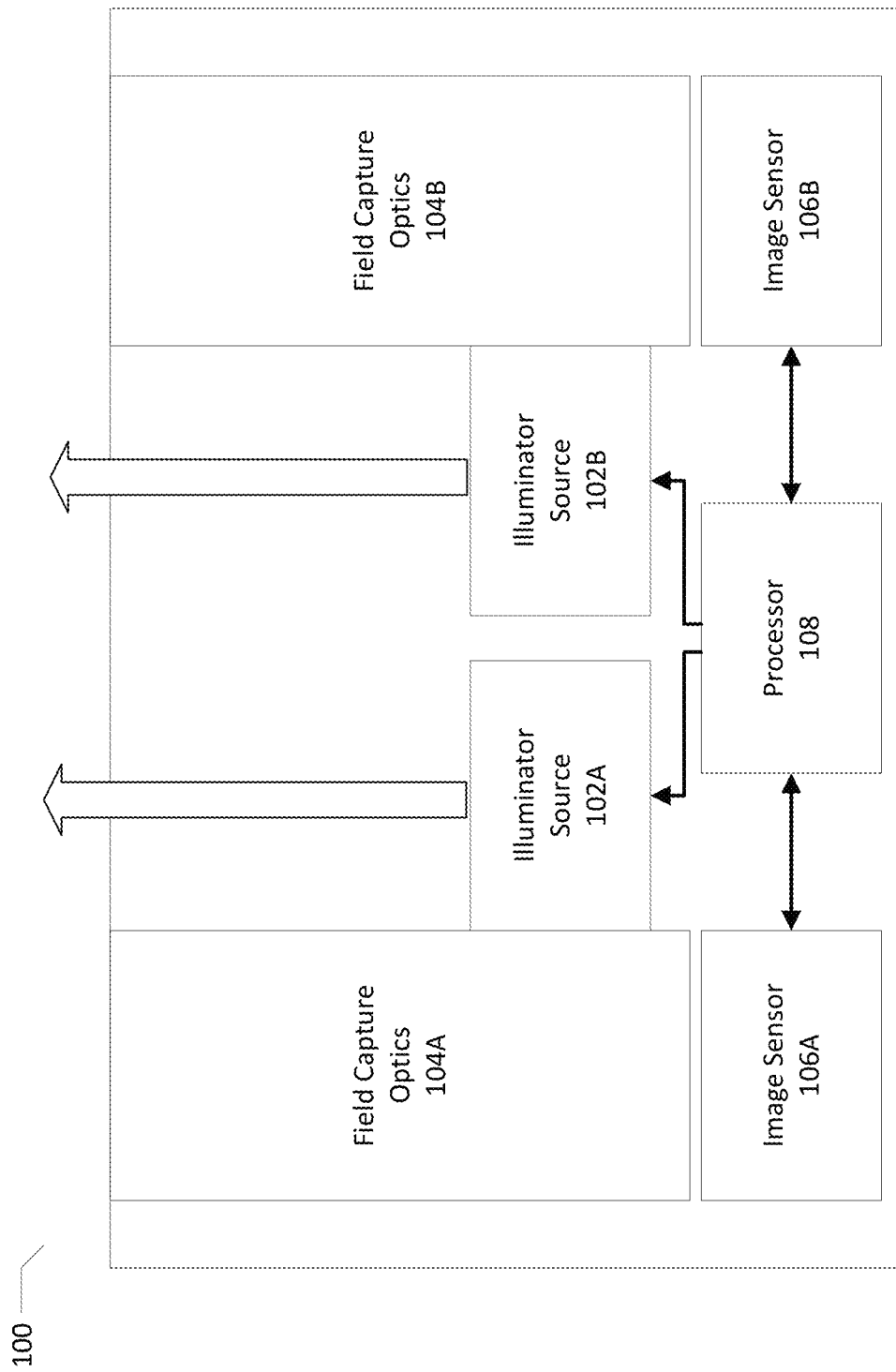
Figure 2:
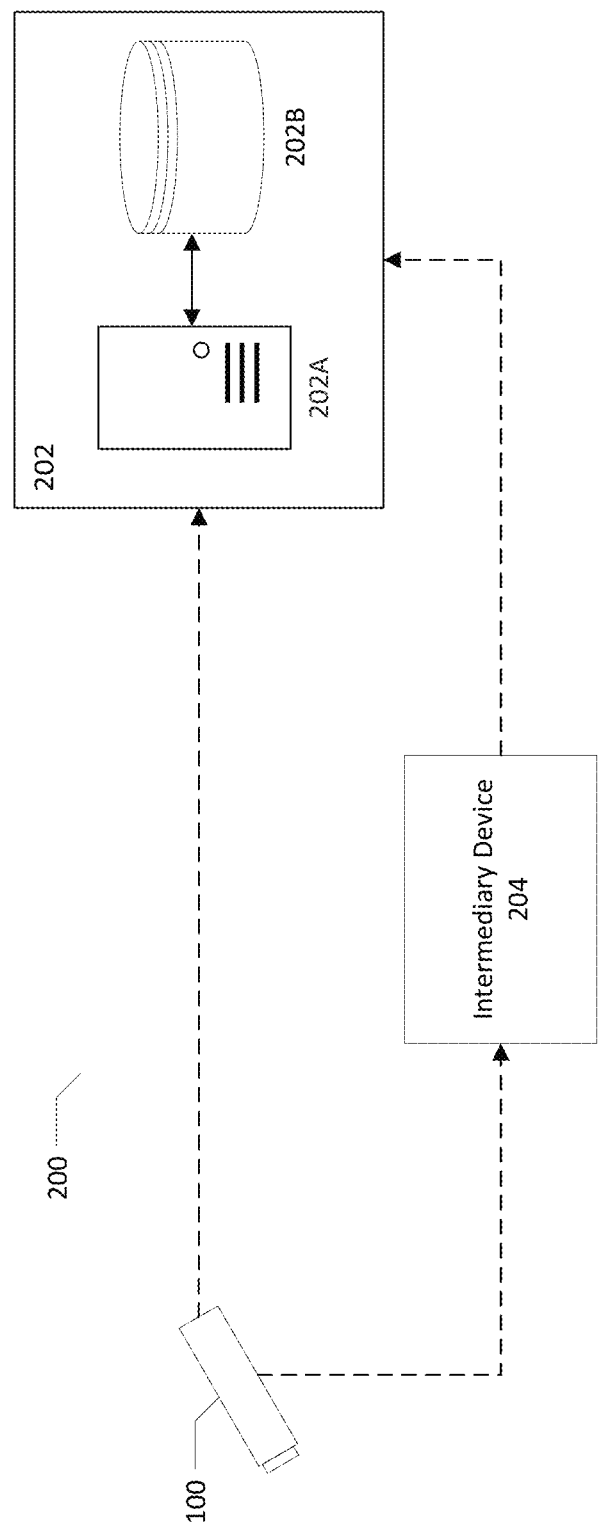
Figure 3:
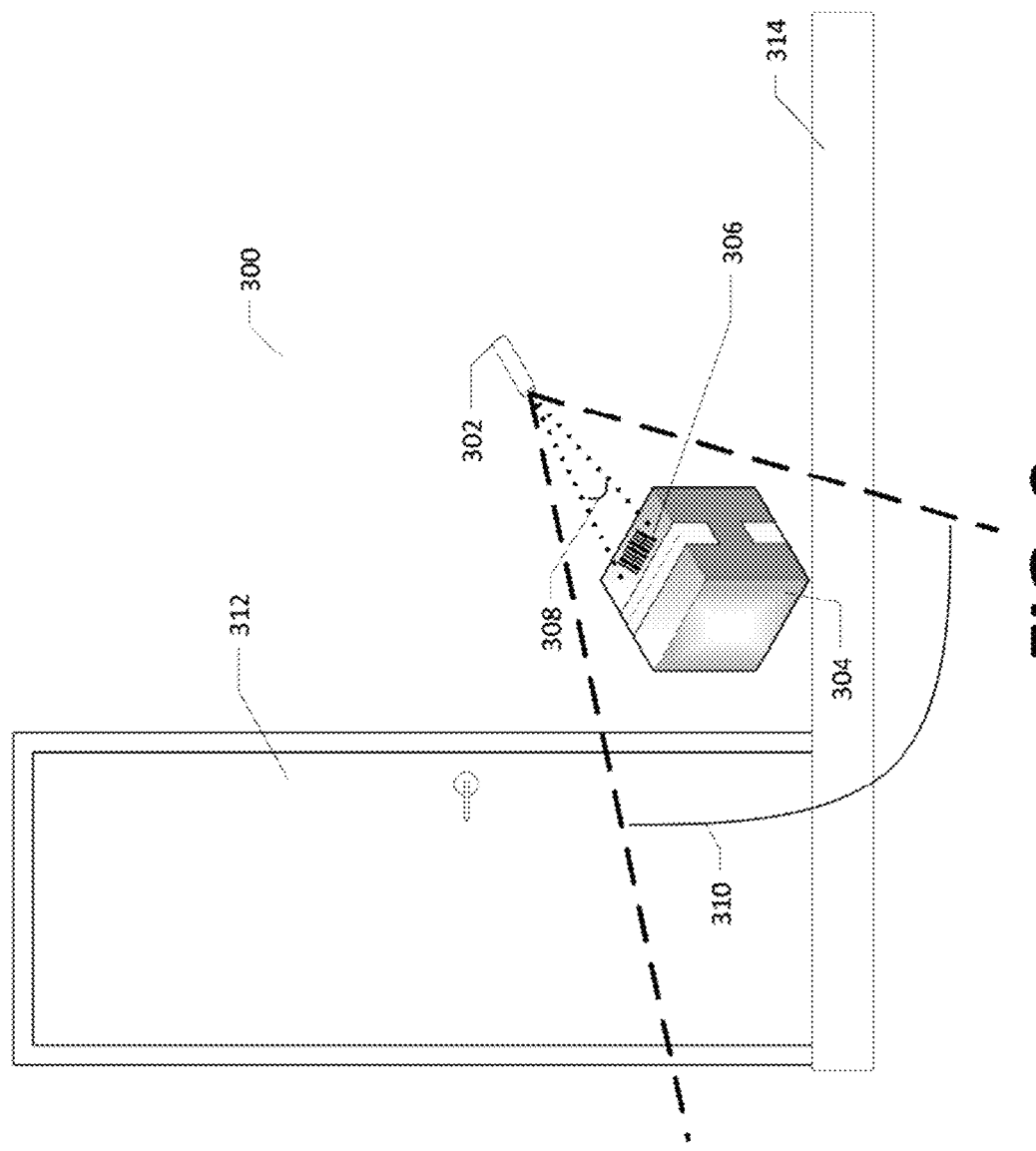
Figure 4:
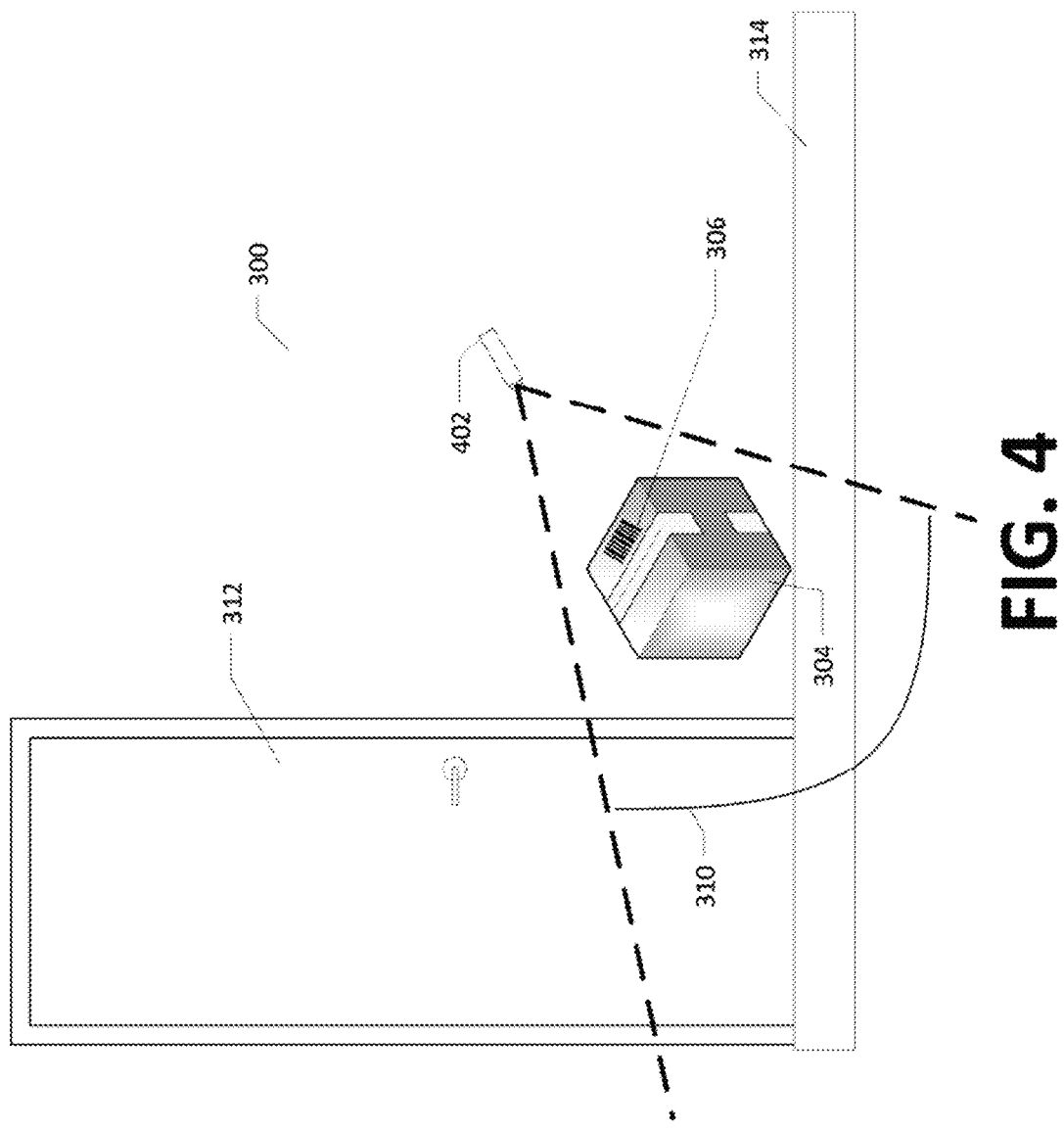
Figure 5:
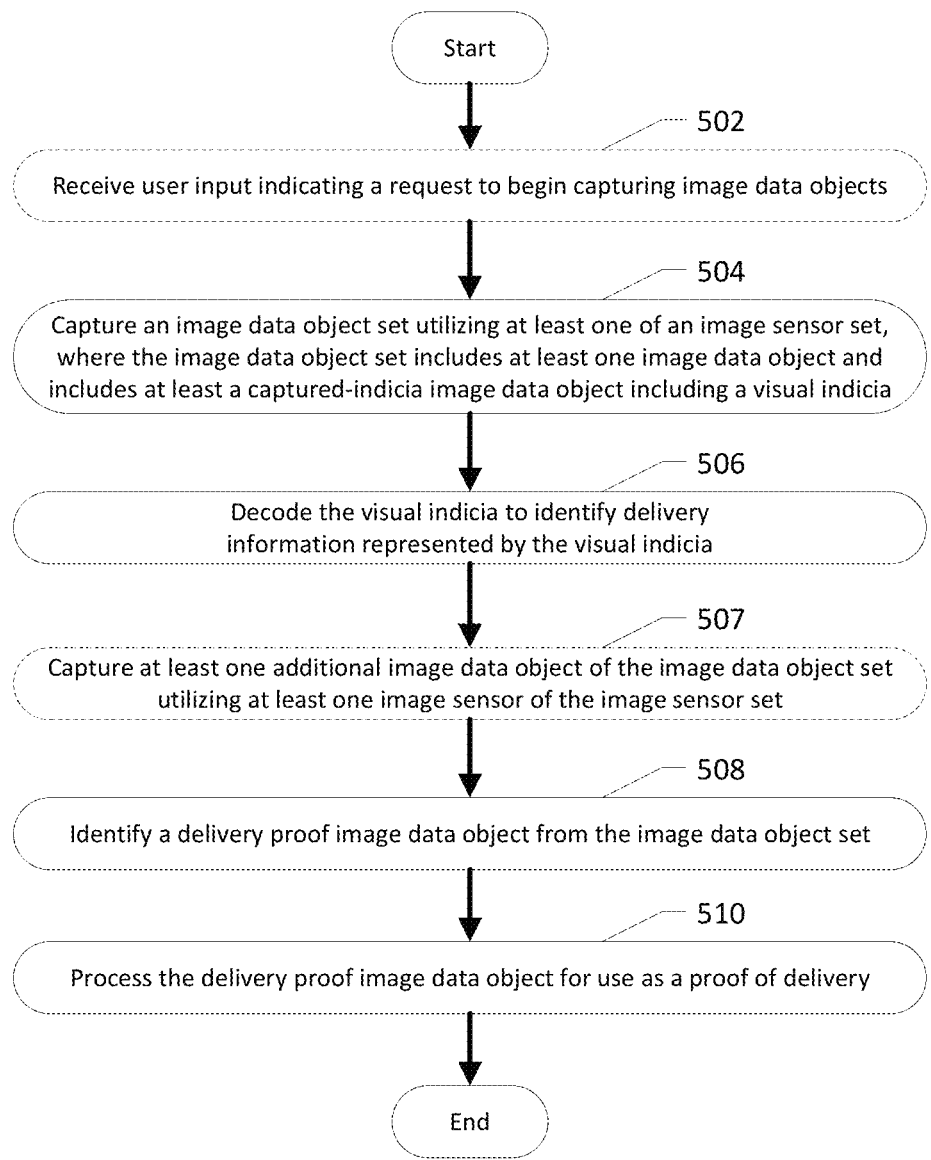
Figure 6A:
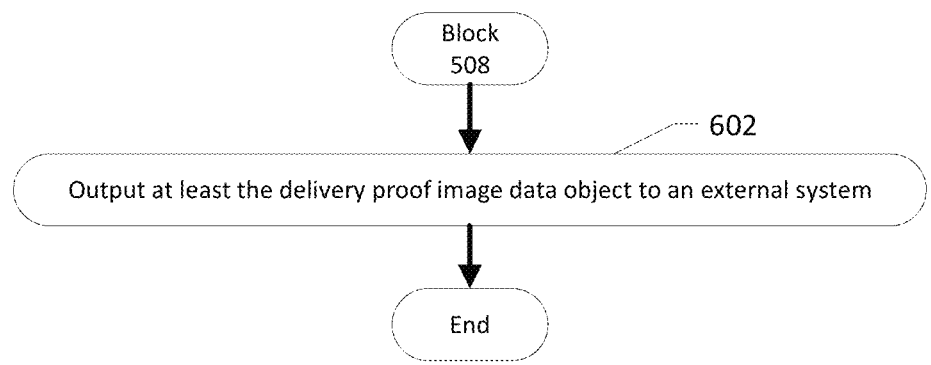
Figure 6B:
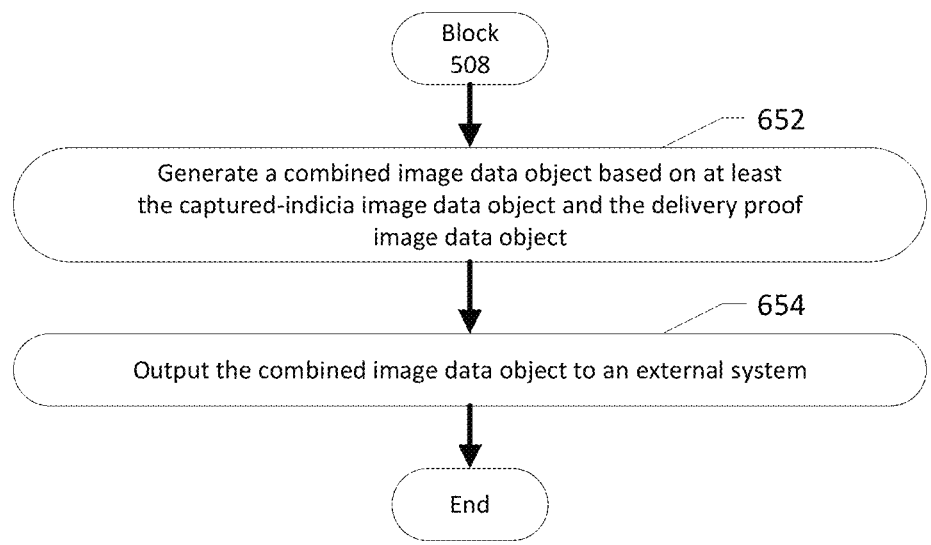
Figure 7:
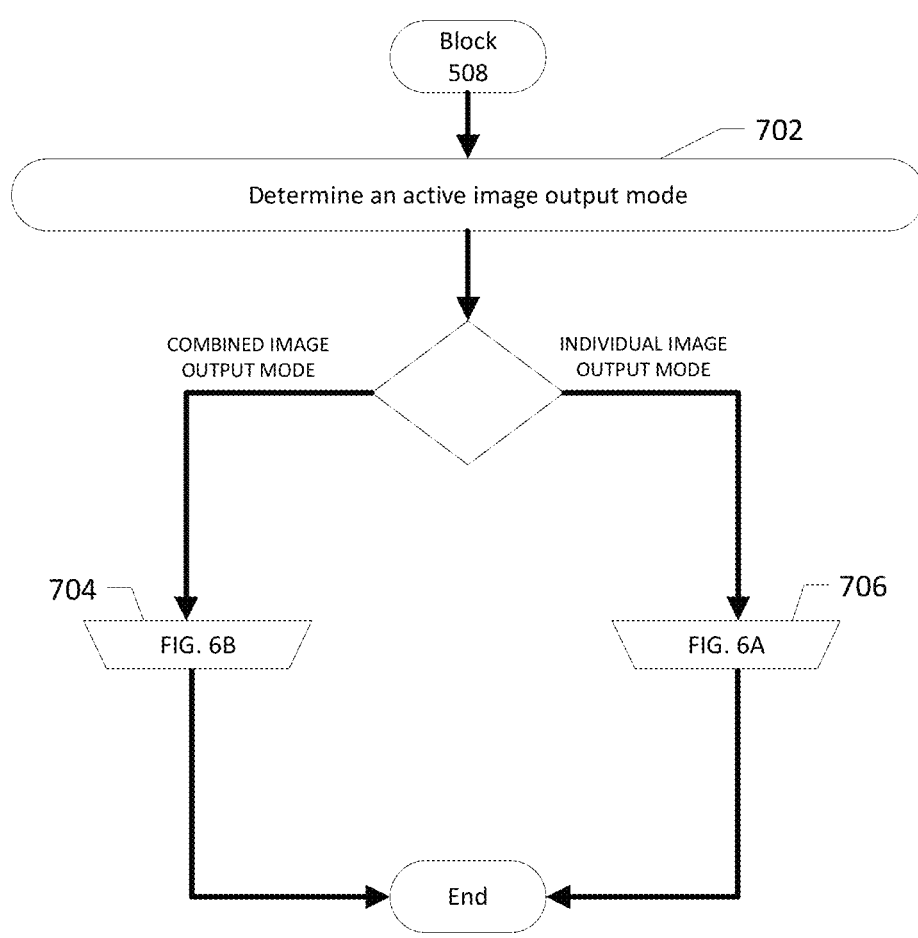
Figure 8:
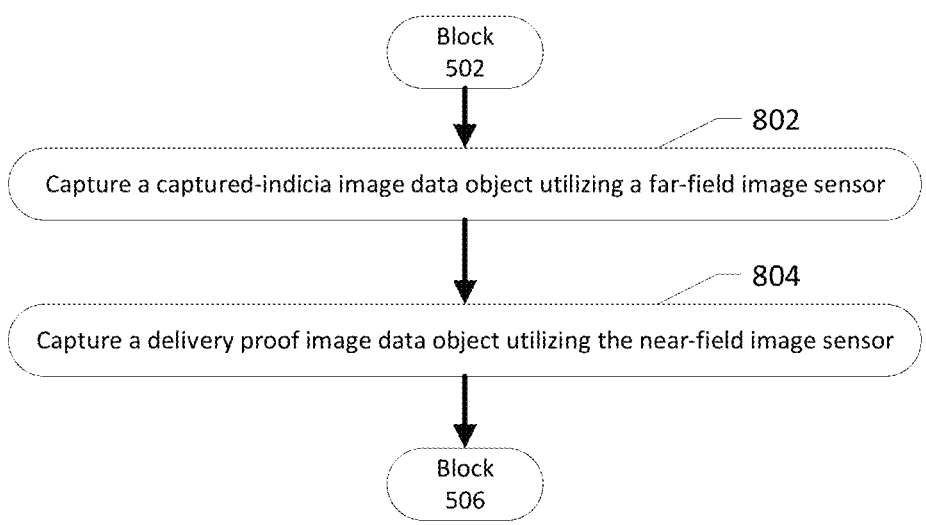
Figure 9:
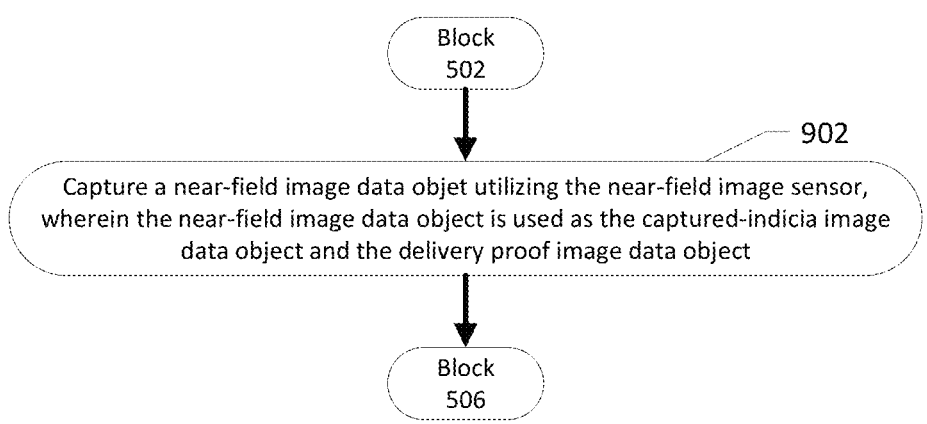
Figure 10:
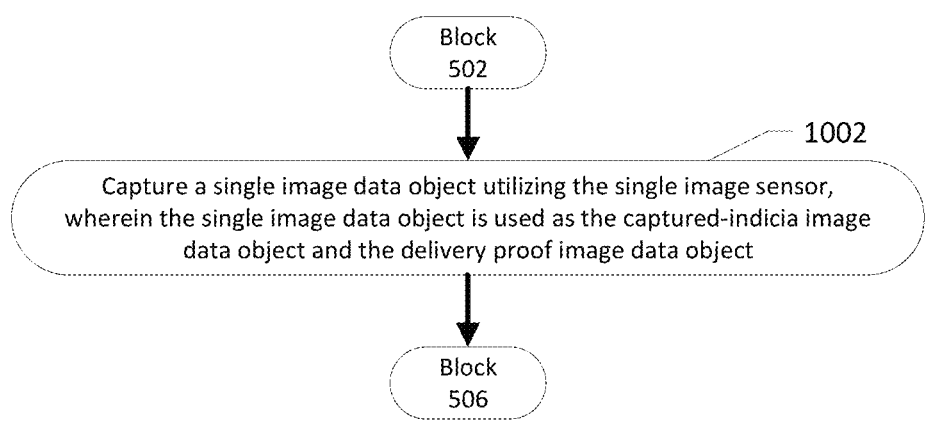
Figure 11:
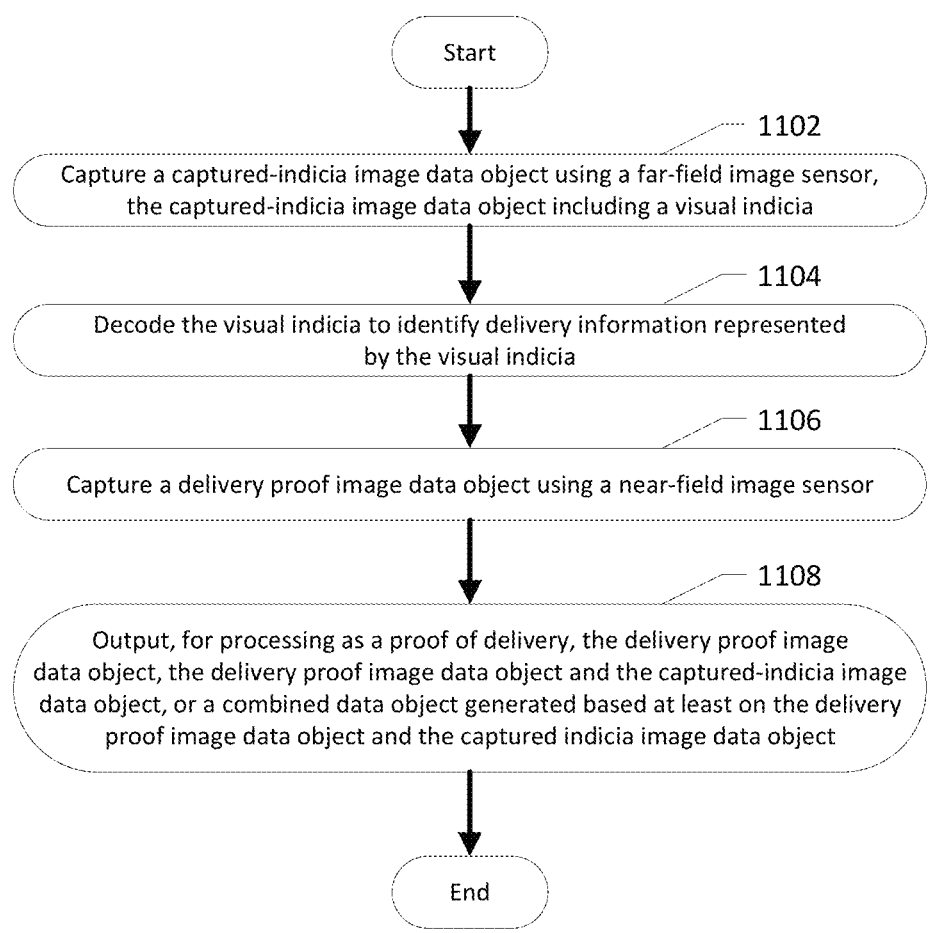

Having thus described the embodiments of the disclosure in general terms, reference now will be made to the accompanying drawings, which are not necessarily drawn to scale, and wherein:

FIG. 1 illustrates a block diagram of an example imaging apparatus that may be specially configured in accordance with at least some example embodiments of the present disclosure;

FIG. 2 illustrates a block diagram of an example system that may be specially designed and/or configured within which embodiments of the present disclosure may operate;

FIG. 3 illustrates a visualization of operation of an example imaging apparatus within an example environment, in accordance with at least some example embodiments of the present disclosure;

FIG. 4 illustrates another visualization of operation of another example imaging apparatus within the example environment, in accordance with at least some example embodiments of the present disclosure;

FIG. 5 illustrates a flowchart including example operations for automatic proof of delivery in accordance with at least some example embodiments of the present disclosure;

FIG. 6A illustrates a flowchart including example additional operations for automatic proof of delivery, specifically to process the delivery proof image data object for use as a proof of delivery, in accordance with at least some example embodiments of the present disclosure;

FIG. 6B illustrates yet another flowchart including example additional operations for automatic proof of delivery, specifically to process the delivery proof image data object for use as a proof of delivery using a combined image data object, in accordance with at least some example embodiments of the present disclosure;

FIG. 7 illustrates yet another flowchart including example additional operations for automatic proof of delivery, specifically to process a delivery proof image data object for use as a proof of delivery based on an active image output mode, in accordance with at least some example embodiments of the present disclosure;

FIG. 8 illustrates a flowchart including example additional operations for automatic proof of delivery, specifically to capture an image data object set using a near-field image sensor and a far-field image sensor, in accordance with at least some example embodiments of the present disclosure;

FIG. 9 illustrates a flowchart including example additional operations for automatic proof of delivery, specifically to capture an image data object set using a near-field image sensor, in accordance with at least some example embodiments of the present disclosure;

FIG. 10 illustrates a flowchart including example additional operations for automatic proof of delivery, specifically to capture an image data object set using a single image sensor, in accordance with at least some example embodiments of the present disclosure; and FIG. 11 illustrates yet another flowchart including example operations for automatic proof of delivery in accordance with at least some other embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

As described above, conventional proof of delivery methodologies require separated steps that must be performed by an operator, such as a delivery person, one at a time. The separation between these steps leaves the process vulnerable to errors and false proof, for example injected by mistake or malicious actions performed by malicious actors. Additionally, conventional systems are vulnerable to communication and/or other errors that cause a portion of the proof of delivery process to complete without completion of the entire process. For example, an operator may scan a barcode of an object and subsequently lose connection with a remote, central system, such as a delivery management system. As such, the delivery management system may detect an issue due to the initiated, yet incomplete proof of delivery process.

Embodiments described herein address the above identified problems, and others associated with conventional proof of delivery methodologies, using a combined or partially combined process. In this regard, embodiments capture one or more image data objects for use in decoding a visual indicia, for example to update a delivery status of an object (e.g., a package, letter, or other mailing) associated with the visual indicia, and for use as a proof of delivery. In this regard, at least some example embodiments described herein provide for automatically performing such steps together without requiring user action by an operator. Alternatively or additionally at least some example embodiments described herein provide for semi-automatically performing such steps and user action by the operator may be minimized.

Embodiments described herein may capture the image data objects using one or more image sensors, and subsequently process the captured image data objects in a myriad of ways. In some example embodiments, automatic proof of delivery is performed in a multi-sensor environment associated with a plurality of image sensors. The plurality of image sensors may include at least a far-field image sensor and a near-field image sensor. The far-field image sensor may be associated with a far field of view, and the near-field image sensor may be associated with a near field of view. In this regard, in some example embodiments, the near field of view is broader than the far field of view in at least one direction such that it captures more of the image sensor environment in the at least one direction. In some example contexts, the near field of view is broader than the far field view in at least both length and width, such that the 2D projection of the near field of view both directions as compared to the 2D projection of the far field of view.

In some example embodiments, the far-field image sensor is utilized to capture a captured-indicia image data object that includes a visual indicia for decoding. The visual indicia may comprise any of a number of decodable symbologies, including without limitation a 1D barcode, 2D barcode, QR Code, OCR, or other encoded pattern/symbology. The visual indicia may be decoded to identify the object and/or identify one or more attributes associated with the object such as volumetric dimensions of the object, weight of the object, and or the like. Additionally or alternatively, successfully decoding the visual indicia may initiate one or more processes for updating the delivery status of the object in a delivery path. For example, an operator may utilize an embodiment described herein to update the delivery status of an object that has successfully been delivered to a final location, or that has reached a checkpoint or other intermediary destination location during shipping.

Further, in some example embodiments, the near-field image sensor is utilized to capture a delivery proof image data object associated with delivery of the object being shipped. In some example embodiments, the far-field image sensor captures the delivery proof image data object in response to successful decoding of the visual indicia. Alternatively or additionally, in some embodiments, the far-field image sensor and near-field image sensor each capture an image data object every frame, and when a visual indicia is successfully decoded from the image data object captured by the far-field image data object, such as when the far-field image sensor captures a captured-indicia image data object, the corresponding image data object captured by the near-field image data object is identified as a delivery proof image data object. It should be appreciated that, due to the difference between the field of views for the near-field image sensor and the far-field image sensor, the near-field image sensor may capture more of the environment than the far-field image sensor. As such, the image data object captured by the near-field image sensor may include various features of the environment that may be useful in acting as a proof of delivery image, for example upon review by a human user or processing by one or more subsequent systems. For example, in some example contexts, the near-field image data object captures a near field of view that enables the delivery proof image data object captured by the near-field image sensor to include more than just the object being delivered and corresponding visual indicia thereupon, such as a portion of the environment where the object was delivered, which may include any of a number of features (e.g., some or all of a stoop, staircase, door, door number, hub number, mailbox, or other environment features). In this regard, the image data object captured by the near-field image sensor may provide more data that is useful as proof of delivery.

Additionally or alternatively, in some example embodiments, the near-field image sensor is configured to capture the captured-indicia image data object and the delivery proof image data object. In this regard, in some example embodiments, the near-field image sensor is configured to capture a single image data object, where the single image data object is utilized as both the captured-indicia image data object and the delivery proof image data object. For example, the single image data object may include the visual indicia with sufficient clarity such that it can be decoded and sufficient environment data for use as a proof of delivery. In some such example embodiments the far-field image sensor may not be activated for one or more instances of proof of delivery. Additionally or alternatively, in some example embodiments, the far-field image sensor may function as a backup sensor for circumstances where the near-field image sensor captures an image data object where visual indicia cannot be successfully identified and/or decoded. It should be appreciated that, in other example embodiments, the near-field image sensor is configured to capture a plurality of image data objects including at least the captured-indicia image data object and delivery proof image data object as separate images. In some embodiments, the near-field image sensor and far-field image sensor utilized for such operations are included together with any number of image sensors. For example, the image sensors may be embodied in a dual-sensor environment, a tri-sensor environment, a quad-sensor environment, or more.

In some other example embodiments, a single image sensor is included to capture the captured-indicia image data object and delivery proof image data object. The single image sensor may embody a sufficient resolution for identifying and successfully decoding visual indicia associated with an object, for example a barcode attached to a delivery package, and capturing sufficient environment data for use as a proof of delivery, for example capturing an image data object based on a field of view including more than just the object. In some such example embodiments, the single image sensor may similarly capture a single image data object that represents the captured-indicia image data object and the delivery proof image data object. In other example embodiments, the single image sensor may capture the captured-indicia image data object and the delivery proof image data object as separate image data objects via two separate captures. In some embodiments, the single image sensor utilized for such operations is one of any number of image sensors. For example, the single image sensor may be embodied in a single-sensor environment, a dual-sensor environment, a tri-sensor environment, a quad-sensor environment, or more.

In some embodiments, the delivery proof of image data object is utilized for any of a myriad of purposes. Some example embodiments are configured to upload the delivery proof image data object to one or more external systems, for example by communicating with a delivery management system to upload the delivery proof image data object for association with a particular delivery package. Some such example embodiments are configured to transmit the delivery proof image data object to the external system to upload the delivery proof image data object, such as through direct transmission to the delivery proof image data object. Some other example embodiments are configured to transmit the delivery proof image data object to the external system to cause the external system to upload the delivery proof image data object, for example where the external system comprises a mobile device, tablet device, or other computing device in local, near-field, or other wireless communication with the embodiment and functions as an intermediary with respect to communications with the delivery management system.

Accordingly, embodiments described herein enable automatic proof of delivery in various sensor environments, including single and multi-sensor environments. Some such example embodiments perform capture of a delivery proof image data object for proof of delivery, or otherwise identify the delivery proof image data object from a captured image data object set, after, upon, and/or in response to successfully decoding a visual indicia captured within the same or another image data object. In this regard, example embodiments disclosed herein provide the hardware and processes for completing the proof of delivery process via a single user action. By reducing the number of actions, human operators may perform the proof of delivery process more efficiently when compared to conventional methodologies. Additionally or alternatively, example embodiments described herein reduce or effectively eliminate the opportunity for errors and/or false proof to be injected into the system, thus minimizing overall system exposure to security vulnerabilities and/or fraud.

In some example embodiments utilizing a plurality of image sensors, for example at least a near-field image sensor and a far-field image sensor, further example advantages may be realized. For example, in this regard, the far-field image sensor may be configured to enable improved capture, detection and/or successful decoding of a visual indicia associated with the object being delivered as compared to single-image sensor embodiments and/or the near-field image sensor alone, while the near-field image sensor may capture sufficient data associated with the environment such that corresponding image data object may be utilized as a proof of delivery. Additionally or alternatively, in some example embodiments, the near-field image sensor may advantageously, as an example, provide a delivery proof image data object sufficient for proof of delivery and a that provides a backup in a circumstance where the image data object captured by the far-field image data object cannot be processed to detect and/or successfully decode a visual indicia within the captured image data object. In this regard, the number of errors and/or failed scans associated with the embodiments described herein may be reduced. Similarly, in other example embodiments, the near-field image data object may be used to capture a single image data object used as both a captured-indicia image data object and delivery proof image data object, where the far-field image sensor functions as a backup in a circumstance where the image data object captured by the near-field image data object cannot be processed to detect and/or successfully decode a visual indicia within the captured image data object.

Some example embodiments are configured to output a plurality of captured image data objects for storage and/or processing. For example, some example embodiments are configured to output a captured-indicia image data object and delivery proof image data object, for example to one or more external systems directly or indirectly through one or more other systems. Such example embodiments may, as an example, advantageously enable such external systems to further store and retrieve each image data object, for example for further processing and/or to display to a user such as in the circumstance where the user requests proof of delivery, and/or subsequently process such image data objects for any of a myriad of purposes (e.g., auditing, confirming functionality of the image capture device, and/or the like).

Additionally or alternatively, some example embodiments are configured to output a combined image data object based on a plurality of captured image data objects. For example, some example embodiments generate a combined image data object based on at least the captured-indicia image data object and the delivery proof image data object. In some example embodiments, the combined image data object is embodied by a file format that enables inclusion of the plurality of captured image data objects without editing of any one of the captured image data objects, for example the Graphics Interchange Format (GIF) or, in other example embodiments, a video file format. Such example embodiments may, as an example, advantageously enable transmission, processing, and/or storing of the plurality of image data objects together, minimizing the likelihood of errors due to maintenance of one of the image data objects without the other(s). For example, utilizing a combined image data object that includes at least a captured-indicia image data object and delivery proof image data object, the combined image data object can be processed to identify the delivered object, update a corresponding status, and display the proof of delivery to a user, and stored such that subsequent auditing can identify the link between the captured-indicia image data object and delivery proof image data object without requiring storage of additional data linking such data objects (e.g., in a relationship table).

Additionally or alternatively, some example embodiments may be configured to enable switching between one or more output modes based on the desired output data objects and/or format. For example, some example embodiments may be set to one active image output mode at a time. In some such example embodiments, a combined image output mode may be activated such that the active image output mode represents the combined image output mode. While the active image output mode represents the combined image output mode, the example embodiment may generate a combined image data object and output the combined image data object, for example to one or more external systems. Further, an individual image output mode may be activated such that the active image output mode represents the individual image output mode. While the active image output mode represents the individual image output mode, the example embodiment may output, separately, one or more of a plurality of captured image data objects. For example, some example embodiments may output just the delivery proof image data object to one or more external systems. Alternatively or additionally, some example embodiments may output, separately, the delivery proof image data object and the captured-indicia image data object to one or more external systems. Example embodiments including at least such output modes enable the embodiment to be used with any of a variety of systems that function in any of the ways corresponding to the data objects output in any of the various modes.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "delivery management system" refers to one or more device(s) embodied in hardware, software, firmware, and/or a combination thereof, configured to maintain data associated with delivery of one or more objects in transit, shipping, and/or the like. In some embodiments, a delivery management system is configured to generate and/or maintain an object identifier for each object in shipping associated with the delivery management system. Additionally or alternatively, in at least some embodiments, a delivery management system is configured to maintain delivery status data for each object identifier, where the delivery status data represents a current location and/or delivery status for the object in shipping represented by the object identifier. Additionally or alternatively, in at least some embodiments, a delivery management system is configured to maintain one or more delivery proof image data object(s) for each object identifier upon delivery of the object represented by the object identifier to a destination location.

The term "proof of delivery" refers to the capture, maintenance, and provision of data sufficient to enable a determination, for example by a system or a human operator, that an object in shipping was delivered to a destination location. In some embodiments, proof of delivery involves an object delivery status linked to a particular object in shipping, for example using an object identifier for the object in shipping, where the object delivery status includes a value indicating the current location and/or delivery status of an object in shipping (e.g., "in transit," "delivered," or the like, or "initial drop off point," "intermediate warehouse 1," "intermediate warehouse 2," "final delivery destination," or the like). Additionally or alternatively, in some embodiments, proof of delivery includes a delivery proof image data object linked to the object in shipping, for example based on an association with the object identifier, as described below.

The term "image data object" refers to a data representation of light data captured via an image sensor. In this regard, the image data object represents a picture captured via the image sensor and any corresponding imaging optics. In some embodiments, an image data object includes a number of data rows and a number of data columns, such that (row, column) combination represents a pixel of data. In this regard, the term "resolution" when used with respect to an image data object, refers to the number of data rows and number of data columns for the image data object (e.g., 1920×1080 represents an image data object having 1920 columns of data and 1080 rows of data). It should be appreciated that each image sensor may be configured to output image data objects of a particular resolution, for example based on the active-pixel resolution for the corresponding image sensor. The term "image data object set" refers to any number of image data objects, which may include zero or more image data objects.

The term "image sensor" refers to computing hardware, software, firmware, or a combination thereof for capturing image data based on light reflected from objects represented in an environment within a particular field of view associated with the image sensor. Additionally or alternatively, in some embodiments, the term "image sensor" additionally refers to additional components and/or structural elements for receiving reflected light, for example imaging optics, illumination sources, and/or pattern projection optics. Additionally or alternatively still, in some embodiments, the term "image sensor" refers to supporting circuitry/hardware, firmware, and/or software for configuring the data captured and/or outputting the data captured. Non-limiting examples of image sensors include a global shutter monochrome sensor (1920×1200 active-pixel array resolution, 3 um pixel), and a global shutter monochrome sensor (1280×800 active-pixel array resolution, 3 um pixel). The term "resolution," when used herein in reference to an image sensor, refers to the active-pixel array resolution for the corresponding image sensor. When used here in reference to one or more image data objects, the term "resolution" refers to a number of data rows and a number of data columns represented by the image data object. It should be appreciated that the resolution of one or more image data objects may be dependent on the resolution of a corresponding image sensor.

The term "near-field image sensor" refers to an image sensor configured for capturing image data within a near-field of view. In this regard, the near-field image sensor may be associated with a sensor focus value that satisfies (e.g., by falling within) a field focus threshold. In some embodiments, the near-field image sensor is associated with a higher active-pixel resolution, such that the near-field image sensor captures a greater amount of data than the far-field image sensor.

The term "far-field image sensor" refers to an image sensor configured for capturing image data within a far-field of view. In this regard, the far-field image sensor may be associated with a sensor focus value that does not satisfies (e.g., by exceeding) a field focus threshold. In some embodiments, the far-field image sensor is associated with a lower active-pixel resolution, such that the near-field image sensor captures a reduced amount of data than the near-field image sensor.

The term "visual indicia" refers to at least one machine readable symbology. In this regard, an exemplary function of the processor(s) may be to decode machine readable provided within the target or captured image data. One dimensional symbologies may be embodied in all sizes including very large to ultra-small, Code 128, Interleaved 2 of 5, Codabar, Code 93, Code 11, Code 39, UPC, EAN, MSI, or other 1D symbologies. Stacked 1D symbologies may include PDF, Code 16K, Code 49, or other stacked 1D symbologies. Further, 2D symbologies may include Aztec, Data Matrix, MaxiCode, QR Code, or other 2D symbologies. It should be appreciated that visual indicia may be decoded utilizing any of a number of known decoding methodologies. In some embodiments, a visual indicia represents any number of encoded data, for example identification and/or processing data associated with an item in shipping.

The term "delivery information" refers to shipping object identification and/or processing information utilized to facilitate the shipping of the associated object and/or one or more associated processes, such as proof of delivery. Non-limiting examples of delivery information include one or more identifiers associated with the object in shipping, a uniform resource locator (URL) for stored data associated with the object in shipping, and/or other information used in performing status update actions. In some embodiments, delivery information is utilized to communicate with a delivery management system to perform one or more actions for tracking the delivery of the object in shipping. For example, the delivery information may include a specially configured link associated with the object in shipping, where accessing the link (e.g., automatically upon decoding the visual indicia by scanning it) updates the delivery status of an associated object in shipping.

The term "captured-indicia image data object" refers to an image data image captured by one or more image sensors that includes a visual indicia. In some embodiments, a processor and/or other computing hardware is configured to detect the visual indicia within an image data object using any of a number of known detection methodologies, and therefore can identify the image data object being processed represents a captured-indicia image data object.

The term "delivery proof image data object" refers to an image data object including sufficient information for a system and/or human operator to determine the object was located at the intended delivery location. For example, a delivery proof image data object may embody a picture of the object in the environment in which it was delivered. In some example contexts, the delivery proof image data object includes one or more features of the environment that may be recognized, detected, and/or otherwise processed by a system and/or human operator. In this regard, a system such as a delivery management system may provide the delivery proof image data object upon request, for example, to enable the requestor to determine from the delivery proof image data object whether the object was delivered to the proper destination location. In some embodiments, the delivery proof image data object includes at least a portion of an object being delivered, and/or associated information such as a label and/or visual indicia, such that the delivery proof image data object further represents the object for which visual indicia was successfully detected and/or decoded.

The term "imaging apparatus" refers to one or more hardware components, software, and/or firmware for capturing and/or processing image data objects. In some embodiments, an imaging apparatus includes at least one imager comprising an image sensor and corresponding field capture optics (e.g., one or more lenses), and processing circuitry configured for controlling the image sensor to capture and output one or more image data objects and configured for processing the outputted image data objects. Additionally or alternatively, in some embodiments, an imaging apparatus includes at least one illumination source configured to produce a desired light illumination level and/or corresponding pattern projection optics designed to project a desired pattern based on the light from the illumination source.

The term "external system" used in reference to an imaging apparatus refers to processing circuitry housed in any device, component, system, and/or apparatus other than the imaging apparatus. A non-limiting example of an external system include an intermediary device, such as a tablet, smartphone, computer, server, and/or other computing hardware in communication with the imaging apparatus and a delivery management system, where the intermediary device is configured to receive data output by the imaging apparatus (e.g., one or more image data objects) for processing and/or transmission to the delivery management system. Another non-limiting example of an external system includes a delivery management system, for example where the imaging apparatus is configured to communicate directly with the delivery management system without use of an intermediary device. In this regard, when utilizing an intermediary device to communicate, the imaging apparatus may be said to communicate with the delivery management system "indirectly" via the intermediary device. In some embodiments, an imaging apparatus is configured to communicate with an external system over one or more wired communication networks and/or wireless communication networks, which may be any combination of public and/or private networks.

The term "image output mode" refers to a configurable setting of an imaging apparatus for determining the image data object(s) for outputting. In some embodiments, an imaging apparatus is configurable such that one of a plurality of image output modes may be selected, for example by a system or via use input, for use. The term "active image output mode" refers to the currently selected image output mode from a plurality of image output modes associated with an imaging apparatus.

The term "combined image data object" refers to an image data object comprising the data of one or more other image data objects from an image data object set. In some embodiments, for example, a combined image data object includes the data of a captured-indicia image data object and delivery proof image data object. In some embodiments, a combined image data object is associated with a predetermined file format that enables inclusion of one or more image data objects without editing and/or data loss of each included image data object. For example, in some embodiments, a combined image data object is formatted using the Graphical Interchange Format (GIF) file format, or any of a number of known video file formats.

The term "combined image output mode" refers to an image output mode that, upon activation, configures the imaging apparatus to output a combined image data object based on one or more predetermined image data objects captured by the imaging apparatus.

The term "individual image output mode" refers to an image output mode that, upon activation, configures the imaging apparatus to output one or more image data objects separately. In some embodiments, the imaging apparatus is configured for outputting each of the one or more image data objects over a separate output channel. In other embodiments, the imaging apparatus is configured for outputting each of the one or more image data objects over the same output channel, for example serially. In some embodiments, an imaging apparatus is configured for outputting only a delivery proof image data object when an individual image output mode is active. Alternatively or additionally, in some embodiments, an imaging apparatus is configured for outputting a delivery proof image data object and a captured-indicia image data object when an individual image output mode is active.

The term "broader," with respect to two or more field of views and/or corresponding image sensors, refers to a view angle defining a particular field of view having a value that is greater than the value for the view angle for another field of view. For example, between a first field of view defined by a 45 degree view angle with respect to a predetermined axis, and a second field of view defined by a 90 degree view angle with respect to the predetermined axis, the second field of view is the broader of the two. In this regard, at the same distance from a particular field, the broader field of view is associated with a first directional value associated with a first projection that is greater than the directional value associated with a second projection.

The term "output" refers to transmission from a particular computing device, or sub-component thereof, to one or more other components, devices, systems, apparatuses, or computing hardware embodied in software, hardware, firmware, or a combination thereof. Embodiments may output data using any of a number of known transmission methodologies, including wired connection(s), serial bus connection(s), wireless connection(s), near-field communication methodologies, radio frequency communication methodologies, and/or the like.

System Architecture and Example Apparatus

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

FIG. 1 illustrates an example block diagram of an example apparatus in accordance with at least one example embodiment of the present disclosure. Specifically, FIG. 1 illustrates an example multi-sensor, multi-illumination source imaging apparatus 100 that may be specially configured for automatic proof of delivery as described herein. The apparatus 100 includes a various components, including the field capture optics 104A and 104B (collectively "field capture optics 104"), the illumination sources 102A and 102B (collectively "illumination sources 102"), the image sensors 106A and 106B (collectively "image sensors 106"), and processor 108. It should be appreciated that, in other embodiments, the apparatus 100 may include any number of image sensors and/or illumination sources (e.g., a tri-sensor and/or tri-illumination source apparatus, a quad-sensor and/or quad-illumination source apparatus, and/or the like). In yet other embodiments, the apparatus 100 includes any number of image sensors and/or illumination sources, to include a single image sensor with a single illumination source. Further yet, in other embodiments, the imaging apparatus may not include any illumination sources, and instead illumination may be provided via separate components and/or a separate device.

Each of the illumination sources 102 may be embodied by any of a number of light generation components. In some embodiments, the illumination source 102A is embodied by one or more light emitting diodes ("LED"), laser emitting diodes, and/or the like. Additionally or alternatively, in some embodiments, the illumination sources 102B is similarly embodied by any number of light generation components. For example, in some embodiments, the illumination source 102B is embodied by one or more LEDs, laser emitting diodes, and/or the like. In some embodiments, each of the illumination sources 102 is associated with pattern projection optics for producing a particular illumination pattern based on the produced light. In this regard, the pattern projection optics associated with the illumination source 102A may be configured to produce a first illumination projection associated with a first illumination pattern, and the pattern projection optics associated with the illumination source 102B may be configured to produce a second illumination projection associated with a second illumination pattern. It should be appreciated that one or more parameters of the illumination sources 102 (e.g., intensity, aperture, or the like) as well as one or more parameters of corresponding pattern projection optics (e.g., a lens angle or other design, lens material, or the like) may influence the illumination produced by each of the illumination sources 102. In this regard, one of the illumination sources 102 may produce an illumination pattern that covers a broader field, in at least one direction, than the other illumination source. The illumination source that projects the broadest illumination pattern may be referred to as the broadest illumination source.

Each of the illumination sources 102 may be associated with a corresponding image sensor and corresponding field capture optics, where the image sensor and field capture optics form an imager for capturing reflections of illuminated light such as the light projected by the corresponding illumination source. In some embodiments, the illumination source 102A is associated with the field capture optics 104A and image sensor 106A located nearest the illumination source 102A. In other embodiments, the illumination source 102A is associated with the field capture optics 104B and image sensor 106B located further from the corresponding illumination source, for example to minimize light leak or other negative effects from light reflected due to the near distance between the components. As illustrated, for example, the illumination source 102A may be associated with the field capture optics 104B and image sensor 106B in a circumstance where the illumination source 102A is a near-field illumination source that may cause light reflection that affects operation of the image sensor 106B if positioned adjacent to the image sensor 106B and field capture optics 104B.

Each illumination source of the illumination sources 102 is configured to produce light at a particular illumination level. In some embodiments, the illumination level for each illumination source is predetermined. In other embodiments, one or more illumination source is configured to produce a variable illumination level, for example based on a received activation signal from one or more other components (e.g., the processor 108 and/or associated supporting hardware). In some embodiments, the illumination level for each illumination source may be determined and/or predetermined based on a myriad of factors. For example, in some embodiments, the illumination levels for the various illumination sources are determined based on the configurations of the included image sensors and/or corresponding field capture optics, such as imaging lenses. In this regard, illumination sources may be included that enable desired functionality associated with the image sensors without overexposing the field for capture to a particular level of illumination. Additionally or alternatively, in some embodiments, the illumination sources included may be particularly selected to enable combinations of illumination sources to be activated to achieve a desired illumination level based on the combination of active illumination sources. It should be appreciated that in some embodiments each illumination source produces a different illumination level, while in other embodiments two or more illumination sources may be associated with the same illumination level.

The field capture optics 104 may each include one or more lenses, and/or subassemblies thereof, configured to enable the corresponding image sensors 106 to capture a particular field of view. In this regard, each of the field capture optics 104 may each be associated with a different focal length, field of view, and/or the like. Additionally or alternatively, each of the field capture optics 104 may be embodied by a different lens configuration and/or optical subassembly. For example, in some embodiments, the field capture optics 104A is embodied by a 3-glass optical lens and the field capture optics 104B is embodied by a 3-plastic optical lens. It should be appreciated that the field capture optics 104 may each be configured based on various requirements for the apparatus (e.g., thermal resistance, cost factors, and/or the like).

The field capture optics 104A are configured to enable light to enter and flow through the optics for capturing by the image sensor 106A. Similarly, the field capture optics 104B are configured to enable light to enter and flow through the optics for capturing by the image sensor 106B. In this regard, the light captured by the image sensor 106B may be based on the illumination patterns projected into the field by the illumination sources 102. Particularly, for example, the illumination source 102B may be configured to produce a first illumination pattern for capture by the image sensor 106A via the field capture optics 104A. Additionally or alternatively, for example, the illumination source 102A may be configured to produce a second illumination pattern for capture by the image sensor 106B via the field capture optics 104B. It should be appreciated that each of the image sensors 106 may be embodied by computing hardware configured to capture such image data, for example utilizing, without limitation, charge-coupled devices ("CCD"), metal oxide semiconductor field-effect transistor ("MOSFET") sensor devices, and/or complementary metal oxide semiconductor ("CMOS") sensor devices, equivalents thereof, or any combination thereof.

Each of the field capture optics 104 may be designed such that the corresponding image sensor of the image sensors 106 is associated with a particular field of view. For example, as illustrated, the field capture optics 104A may be designed such that the image sensor 106A captures a first field of view. The first field of view may be defined by a first view angle, the angle defined from a linear axis from the center of the field capture optics 104A. In this regard, the image sensor 106A is configured to capture light reflected from environment features within the first field of view and produce a corresponding image data object that represents the objects in the field of view. Similarly, as illustrated, the field capture optics 104B may be designed such that the image sensor 106B captures a second field of view. The second field of view may be defined by a second view angle, which may be the same, greater than, or less than the first view angle. In this regard, the image sensor 106B is configured to capture light reflected from environment features within the second field of view and produce a corresponding image data object.

In at least one example embodiment, the image sensors and corresponding field capture optics define a near-field imager, comprising a near-field image sensor and corresponding near-field capture optics (such as field capture optics 104A and image sensor 106A), and a far-field imager, comprising a far-field image sensor and corresponding far-field capture optics (such as field capture optics 104B and image sensor 106B). The far-field imager and near-field imager may each be associated with a different view angle, for example where the far-field imager is associated with a smaller view angle than the near-field imager. As defined by the view angle, the far-field imager is configured to capture a narrower field of view compared to a broader field of view associated with the near-field imager. In this regard, the data captured by the near-field imager may be spread across a wider (and/or taller) area, such that more environmental features are captured. Similarly, the far-field imager may be more concentrated on a narrower area in one or more directions, for example to concentrate the area on a visual indicia to be captured, detected, and decoded. Thus, when the far-field imager is concentrated on a visual indicia (e.g., a barcode on a label attached to a shipped object), the near-field imager may capture an image data object including sufficient environment data such that the image data object may be used as a proof of delivery to the location represented by the environment. In some embodiments, to enhance the clarity of the captured image across a broader field of view, the near-field imager is associated with a higher active-pixel resolution as compared to the corresponding far-field imager. In a particular example context, for example, the far-field imager includes a 1 megapixel image sensor as a far-field image sensor and the near-field imager includes a 2.5 megapixel image sensor as a near-field image sensor.

It should be appreciated that, in some embodiments, the near-field imager and the far-field imager may be associated with different or the same focal distances. For example, in some embodiments, the focal distance for the near-field imager is closer than the focal distance for the far-field imager. In this regard, each imager may be designed for optimal functionality at a certain, predetermined distance from an object intended for representing within a captured image data object.

In some embodiments, the illumination source 102A and/or illumination source 102B are specifically configured based on the image sensors 106. For example, in some embodiments, the illumination source 102B is a broadest illumination source configured for illuminating a particular field of view (e.g., a broad field of view compared to one or more other field of views). In this regard, the illumination source 102B may be configured for producing a broad illumination pattern that sufficiently illuminates the field of view captured by the image sensor 106A and the image sensor 106B. The illumination source 102A may be a second illumination source specially configured for producing a second illumination pattern that optimizes the illumination of the field of view captured by the image sensor 106B, specifically, in conjunction with the field capture optics 104B. In this regard, the specific configurations of the illumination sources 102 may be optimized based on such intended usages. In this regard, for example, one of the image sensors 106 in conjunction with one of the corresponding field capture optics of the field capture optics 104 may represent a near-field imager configured to capture a broader field of view than a far-field imager represented by the other of the field capture optics 104 and the other of the image sensors 106. Example field of views are described below with respect to FIGS. 3 and 4.

The processor 108 comprises a computing device, and/or computer hardware, software, firmware, and/or a combination thereof, configured to perform various specially programmed operations and/or communicate with the various other components depicted with respect to the apparatus 100. In some embodiments, the processor 108 is embodied in processing circuitry configured for performing the operations described herein. In other embodiments, the processor 108 is embodied by a microprocessor. In yet other embodiments, the processor 108 is embodied by a CPU. In yet other embodiments, the processor 108 is embodied by one or more controllers and/or associated support hardware. The processor 108 may include, or otherwise be associated with, one or more memory devices storing instructions representing the various operations described herein, and/or for use in storing and/or receiving data objects and/or other data values for use in one or more programmed operations.

Additionally or alternatively, in some embodiments, the processor 108 includes or is associated with additional hardware and/or software for performing one or more of the operations described herein. For example, in some embodiments, the imaging apparatus 100 includes hardware, software, and/or a combination thereof for switching between activation of the image sensors 106, such as a first image sensor (for example, a near-field image sensor) and a second image sensor (for example, a far-field image sensor). Additionally or alternatively, in some embodiments, the imaging apparatus 100 includes hardware, software, and/or a combination thereof for switching between activation of the illumination sources 102, such as a first illumination source (for example, a near-field illumination source) and a second illumination source (for example, a far-field illumination source). Such supporting hardware includes, without limitation, one or more switches, controllers, and/or the like.

In some embodiments, for example, the processor 108 is configured to communicate with the illumination sources 102. In this regard, the processor 108 may be configured to communicate with the illumination sources 102 for transmitting one or more activation signals and/or deactivation signals. The activation signal may cause the recipient illumination source to begin producing light, and the deactivation signal may cause the illumination source of the illumination sources 102 to cease producing light. In some such embodiments, the illumination source(s) may be activated to enable scanning of a field of view for a visual indicia by the corresponding image sensor(s).

Additionally or alternatively, in some embodiments, for example, the processor 108 is configured to communicate with the image sensors 106. In this regard, the processor 108 may be configured to communicate with the image sensors 106 for transmitting one or more activation signals. The activation signal may cause the recipient image sensor of the image sensors 106 to capture an image data object and/or output the captured image data object. Further, in this regard, the processor 108 may be configured to communicate with the image sensors 106 to receive image data objects captured and outputted by the image sensors 106. In some embodiments, the processor 108 is configured to associate an image sensor of the image sensors 106 with an illumination source of the illumination sources 102. In this regard, the illumination source of the illumination sources 102 may activate an illumination source and, at the same time or after a predetermined delay, to activate the corresponding image sensor to cause the image sensor to capture an image data object. In some embodiments, the processor 108 is embodied by a plurality of sub-processors, each associated with one of the image sensors and/or corresponding illumination sources.

The processor 108 may be configured to process the received image data objects via one or more actions. For example, in some embodiments, the processor 108 is configured to process the captured image data objects for purposes of detecting visual indicia in the captured image data object(s), and if detected subsequently decoding the visual indicia within the captured image data object. In this regard, an exemplary function of the processor(s) may be to determine that a captured image data object is a captured-indicia image data object including visual indicia, for example using one or more known algorithms for processing image data to detect any number of visual indicia types. Additionally or alternatively, in some embodiments, the processor 108 may perform subsequent actions based on whether a visual indicia was detected. For example, if no visual indicia was detected, subsequent image data object(s) may continue to be captured. In some embodiments, if the a visual indicia was detected, the processor 108 may attempt to decode the visual indicia, for example to identify information represented therein. If the processor 108 cannot successfully decode the visual indicia, subsequent image data object(s) may continue to be captured. In some embodiments, if the processor 108 successfully decodes the visual indicia, one or more actions for updating a delivery status and/or providing a proof of delivery is/are performed, for example as described herein.

In other embodiments, the apparatus 100 includes any number of components utilized for a particular intended operation. For example, in at least some embodiments, the apparatus 100 includes an aimer light emitter and/or corresponding aimer pattern projection optics to enable projection of an aimer pattern within one or more field of view(s), for example for use by an operator and/or automated system in scanning one or more visual indicia(s). Additionally or alternatively, in some embodiments, one or more components includes various subassemblies therein, each subassembly specially configured for performing particular functionality of the associated component. For example, in some embodiments, the processor 108 and/or illumination sources 102 are associated with driver components configured for controlling activation and/or deactivation of the illumination sources 102, and/or sensor drivers for controlling capture by the image sensors 106, for example upon activation.

In some embodiments, the processor 108 includes or is otherwise associated with a communications module configured for enabling transmission of signals to and/or from the imaging apparatus 100. For example, in some embodiments, the communications module may be configured to enable transmission of one or more captured image data object(s) to an external system, such as to an intermediary device and/or directly to a delivery management system. The communications module may enable communications over a close communications range (e.g., via a direct wired connection with the external device, Bluetooth or other near field communications methods, and/or the like), and/or over a large communications range (e.g., via a wired and/or wireless network communication such as the Internet). In some such embodiments, the communications module is configured entirely in hardware, entirely in software and/or firmware, or in a combination thereof.

In some embodiments, the processor 108 is configured to utilize a particular image sensor as a default for each processing operation. For example, in some embodiments, the processor 108 is configured to activate a far-field image sensor for use in capturing image data objects in attempting to detect and decode a visual indicia therein, for example to identify a captured-indicia image data object. In this regard, the processor 108 may be configured to activate another image sensor, such as a far-field image sensor, for such a use in a circumstance where no visual indicia is successfully detected and decoded within certain parameters, such as a certain length of time or number of captures. In some embodiments, the processor 108 is configured to utilize, as default for each scanning operation, the image sensor activated by default is selected based on which image sensor captured the captured-indicia image data object in a previous scanning operation. Additionally or alternatively, in some embodiments, the processor 108 is configured to activate a near-field image sensor for use in capturing one or more delivery proof image data objects for use as proof of delivery.

In some embodiments, the imaging apparatus 100 is integrated into a mobile computer that includes one or more additional components and/or facilitates one or more of the operations described herein with respect to proof of delivery. The mobile computer may include an additional processor, memory device(s), communications module, and/or other hardware and/or software configured to perform one or more of the operations described herein. For example, in some embodiments the processor of the imaging apparatus 100 is in communication with one or more additional co-processors and/or sub-processors of the mobile computer to enable transmitting of one or more image data objects to an external system. Additionally, the mobile computer may be configured to house the imaging apparatus 100 within for purposes of enabling communication between the imaging apparatus 100 and other components therein. For example, in some embodiments the imaging apparatus 100 is housed within an apparatus chassis. The apparatus chassis may provide a desired handheld designed for interaction with the imaging apparatus 100. For example, in some embodiments, the imaging apparatus 100 is housed in a mobile apparatus chassis, which may be integrated into other designed chasses for handheld or automatic use of the apparatus 100. In at least some embodiments, the imaging apparatus 100 is housed in an apparatus chassis designed as a handheld scanner, for example including a button or trigger component for activating the imaging apparatus 100.

In some embodiments, the imaging apparatus 100 is housed together with and/or otherwise in communication with additional components for enabling further storage, processing, and/or communication of the captured image data objects. For example, in some embodiments, the imaging apparatus 100 includes or is in communication with a memory module configured for storing image data objects such as a captured-indicia image data object, a delivery proof image data object, and/or a combined image data object. Additionally or alternatively, the imaging apparatus 100 includes or is in communication with a communications module configured to enable transmission of information to an external system and/or receiving of information from an external system. Such a communications module may be used to transmit image data objects and/or corresponding request(s) to the external device after successfully completing one or more operations of a process for proof of delivery. For example, the image data objects may be transmitted after successfully decoding the visual indicia and capturing the delivery proof image data object.

FIG. 2 illustrates a block diagram of an example system that may be specially designed and/or configured within which embodiments of the present disclosure may operate. As illustrated, FIG. 2 illustrates an example system 200 including various computing hardware in communicate with one another. Specifically, the example system 200 includes the imaging apparatus 100 as described above with respect to FIG. 1. Further, the example system 200 includes several external systems with respect to the imaging apparatus 100, for example the delivery management system 202 and the intermediary device 204. It should be appreciated that the various components are illustrated for example and descriptive purposes only, and are not to limit the scope and spirit of the disclosure herein.

The delivery management system 202 may be embodied in computing hardware, software, firmware, or a combination thereof, for maintaining data associated with delivery of one or more objects in shipping. Additionally or alternatively, in some embodiments, the delivery management system 202 is communicable with one or more client devices (for example a user device accessing the delivery management system 202 via a web or native application executed via the client device, not depicted), such that a user can access the delivery management system 202 to check the status of a delivery associated with an account for the user (e.g., a delivery they sent or is being sent to them, or otherwise for which they have an identifier) and/or verify proof of delivery if desired (e.g., through accessing proof of delivery data), and/or providing other delivery-related actions. In this regard, the delivery management system 202 may store information configured to store user account information to enable a user to authenticate submitted credentials with the system for purposes of accessing delivery status data and/or delivery proof data, such as one or more delivery proof image data objects, that the delivery management system 202 is configured to maintain associated with the user account.

The delivery management system 202 includes a delivery management server 202A and a delivery management database 202B to enable performance of various actions associated with maintaining the data associated with delivery of such objects. It should be appreciated that the delivery management server 202A and delivery management database 202B may be communicable with one another to facilitate performance of such actions. In some embodiments, the delivery management server 202A and delivery management database 202B are locally positioned to one another. In other embodiments, the delivery management server 202A and the delivery management database 202B are remote from one another, for example where one or more of the components is a cloud system communicable with the other component over one or more communication networks.

The delivery management server 202A may be embodied by a computer or a plurality of computers, computing hardware, or the like. At least some example embodiments include a delivery management server 202A embodied by one or more server hardware configurations programmed for communication via the Internet, for example to communicate with one or more client devices, intermediary devices, and/or imaging apparatuses. The delivery management server 202A may be communicable with the imaging apparatus 100. For example, the imaging apparatus 100 may receive one or more image data objects, and/or one or more associated requests, for processing and/or storage of such data. In some embodiments, the delivery management server 202A receives at least a delivery proof image data object for storage associated with an object identifier. In some embodiments, the delivery management server 202A receives the object identifier from the imaging apparatus 100 together with the delivery proof image data object, for example where the imaging apparatus 100 identified the object identifier from delivery information decoded from a visual indicia on or associated with the object itself upon delivery. Additionally or alternatively, in response to receiving data from the imaging apparatus 100 or based on a received request, the delivery management server 202A may be configured to perform one or more actions to update delivery status data associated with an object identifier corresponding to a delivered object. In this regard, the delivery management server 202A may update stored location data to a next location in a predetermined delivery chain managed by the delivery management system 202, or to a location identified from received request data.

The database 202B may be embodied as a data storage device, such as one or more local storage device(s), one or more memory device(s), cloud storage device(s), network attached storage ("NAS") device or a plurality of NAS devices, or as a separate database server of plurality of servers. The database 202B may be configured for storing any of a myriad of information associated with proof of delivery. For example, in some embodiments, the database 202B is configured to at least store object identifiers associated with objects for shipping, and data associated with each object identifier that indicates the last known status of the object being shipped, related shipping information (e.g., volumetric data, weight data, and/or the like), biographical information associated with the object (e.g., information associated with a person shipping the object and/or recipient of the object), and/or the like. Additionally or alternatively, the database 202B may be configured to store a proof of delivery data associated with each object such that, when the object is successfully delivered, the proof of delivery data may be analyzed and/or processed to verify aspects of the delivery were successfully completed (e.g., the correct object was delivered, the object was delivered to the correct destination location, the object was left in the correct place at the destination location, and/or the like). In some embodiments, the database 202B is configured to store such information organized into any number of data records having any number of the aforementioned fields therein, each data record associated with at least an object identifier.

In some such embodiments, the delivery management server 202A performs one or more actions for data storage, retrieval, and/or updating via communication with the delivery management database 202B. For example, in some embodiments, the delivery management database 202B is configured to store at least delivery status data and/or one or more delivery proof image data objects for each object identifier managed by the delivery management system 202. The delivery management server 202A may receive an object identifier from the imaging apparatus 100, for example where the object identifier was decoded from visual indicia associated with the object, or identify the object identifier based on information received from the imaging apparatus 100. In this regard, to update the delivery update status for an object identifier, the delivery management server 202A may request the delivery management database 202B store the updated data value as the delivery update status in a record associated with the object identifier, where the record is maintained by the delivery management database 202B. Similarly in this regard, to update the delivery proof image data object for the object identifier, the delivery management server 202A may request the delivery management database 202B store a received delivery proof image data object in the record associated with the object identifier and maintained by the delivery management database 202B. The delivery management database 202B may continue to store such data into one or more records as retrievable based on the object identifier and/or one or more associated identifiers. As such, the delivery management server 202A may retrieve record(s) corresponding to one or more object identifier(s), and process, display, or otherwise utilize the information therein for various auditing, user inquiry, and other delivery handling services. For example, in one example context, the delivery management server 202A is configured to retrieve a record for an object identifier in response to a request from a user via a client device (not depicted) that requests information on whether a package has been reported as delivered yet.

The intermediary device 204 may be embodied by any of a variety of computing devices configured for communication with the delivery management system 202. For example, electronic data received by the intermediary device 204 from the imaging apparatus 100 may be processed for transmission to the delivery management system 202. Similarly, the electronic data received by the delivery management system 202 from the intermediary device 204 may be provided in various forms and via various methods for processing, such as using any of a number of communication protocols between computing devices. For example, the intermediary device may include one or more desktop computers, laptop computers, smartphones, netbooks, tablet computers, wearables, and/or the like. The intermediary device 204 may include a networking interface to enable communications with apparatuses, systems, and/or devices external to the intermediary device. The intermediary device 204 may be configured to enable communications over various networks utilizing various networking hardware, software, and/or firmware (e.g., Bluetooth between a smartphone/tablet device and an imaging apparatus, a carrier network between a smartphone and a delivery management system, and/or one or more wireless and/or wireless networks for communicating via the Internet between an intermediary device and a delivery management).

In an example context, the intermediary device 204 may execute an application or "app" to enable interaction with the imaging apparatus 100 and/or delivery management system 202. Such applications are typically designed for execution via a computing device dependent on the operating system and/or other configurations associated with the computing device. For example, an application may be provided that executes on mobile device operating systems such as iOS®, Android®, or Windows®. Alternatively, an application may be provided that executes on a personal computer operating system, such as Windows®, macOS®, Linux®, or another operating system executed on a laptop device, desktop device, or terminal device. These platforms typically provide frameworks that allow applications to communicate with one another and/or with particular hardware and/or software components of the intermediary device. For example, the mobile operating systems and/or personal computer operating systems named above each provide frameworks for interacting with location services circuitry, wired and/or wireless network interfaces, locally stored databases, and other applications. In an example context, the application is embodied by a native service application installed to and/or otherwise executable via the intermediary device. Communication with hardware and software modules outside of the application is typically provided via one or more application programming interfaces (APIs) configured by the operating system for the intermediary device.

Alternatively or additionally, the intermediary device 204 may interact with the imaging apparatus 100 and/or delivery management system 202 via a web application. In an example context, the web application is embodied by a web browser executed the intermediary device 204 and accessing a specific web resource (e.g., via a particular URL).

In some embodiments, the delivery management system 202 is configured to communicate, for example via a network interface of the delivery management server 202A, with the imaging apparatus 100 directly, through one or more intermediary devices, or via a combination thereof. For example, in some embodiments, as illustrated, the imaging apparatus 100 is configured to communicate directly with the delivery management system 202. In some such contexts, the imaging apparatus 100 may include a networking interface, transceiver, and/or the like, to facilitate communication with the delivery management system 202 over one or more communications networks. It should be appreciated that the networking components for establishing a direct connection between the imaging apparatus 100 and delivery management system 202 may be based on a physical distance between the imaging apparatus 100 and the delivery management system 202.

In other example contexts, the imaging apparatus 100 is configured to communicate indirectly with the delivery management system 202. For example, as illustrated, the imaging apparatus 100 may be configured to communicate with intermediary device 204, which is subsequently in communication with the delivery management system 202. In this regard, the imaging apparatus 100 may communicate with the delivery management system 202 indirectly via one or more intermediary devices, such as the intermediary device 204. In an example context, the intermediary device 204 is configured to function as a relay for the imaging apparatus 100. As such, the imaging apparatus 100 may transmit data and/or one or more corresponding requests to intermediary device 204 for further processing and/or communication. The intermediary device 204 may receive the data from the imaging apparatus 100 and forward the data to the delivery management system 202 for processing and/or storage.

In some example contexts, the imaging apparatus 100 is configured to communicate with the intermediary device(s) over a first communication network, and the intermediary device(s) are configured to communicate with the delivery management system 202 over a second communication network. For example, in some embodiments, the imaging apparatus 100 includes networking components to communicate with one or more intermediary device, such as the intermediary device 204, over a limited range. In one example context, the imaging apparatus 100 may communicate with the intermediary device 204 over a direct wired connection, such that the distance between the imaging apparatus 100 and intermediary device 204 is limited by the length of the corresponding wire. Additionally or alternatively, in another example context, the imaging apparatus 100 may communicate with the intermediary device 204 over a limited range wireless connection, for example via near field communications, Bluetooth, short-range radio frequency communications, and/or the like. The intermediary device 204 may receive the data transmitted from the imaging apparatus 100. In at least some embodiments, the intermediary device 204 may be executing one or more service applications (e.g., a native software application and/or browser-based web application) to enable communication between the imaging apparatus 100 and the intermediary device 204. Further, the intermediary device may transmit it to the delivery management system 202, for example based on actions performed via the service application(s), over a second communication network. In an example context, the second communication network is associated with a longer range than the first communication network, for example via a wired and/or wireless network connected to the Internet, such that the intermediary device 204 may transmit the received data over any necessary distance. By communicating through an intermediary device, the component cost and complexity associated with manufacturing and functionality of the imaging apparatus 100 may be reduced while still enabling transmission from the imaging apparatus 100 to the delivery management system 202.

Example Embodiment Using Visualizations

FIGS. 3 and 4 each illustrate a visualization of operation of an example imaging apparatus within an example environment in accordance with at least one example embodiment of the present disclosure. In this regard, the specific attributes of the environment, objects, and operation of the imaging apparatus are provided for descriptive purposes with respect to the specific attributes as depicted. It should be appreciated that, in other embodiments, one or more attributes of the environment and/or imaging apparatus may be different. Thus, the specifics depicted with respect to FIGS. 3 and 4 should not be considered to limit the scope and spirit of the disclosure.

FIG. 3 depicts an example environment 300, within which an example imaging apparatus 302 is in operation for automatic proof of delivery as described herein. The environment depicted may be associated with a delivery location (e.g., the stoop of a house, a business location, an apartment, or the like) where an object, specifically object 304, is to be shipped. As illustrated, the environment 300 includes several features, including a floor 314 and a door 312. The floor 314 and/or door 312, one or more associated environment features such as a door mat, and/or background features, may be processed and/or analyzed to identify the location based on such features. For example, aspects of the floor 314 (including, without limitation, color, material, shape, unique markings, and/or door 312, and/or the contrast between them, may enable a system and/or human operator to identify the location represented by the environment 300 within a reasonable level of certainty. As such, by capturing sufficient features of the environment 300 in an image represented by an image data object, such a captured image may be used as proof (a "delivery proof image data object") that a shipped object, such as the object 304, was successfully delivered to the location represented by environment 300.

The environment 300 also includes object 304. The object 304 may embody any package, mailing, or other item delivered to the location represented by the environment 300. For example, in some embodiments the object 304 represents a container of any shape, for example a cuboid as depicted, including an item shipped to the location represented by the environment 300 for any of a myriad of purposes, for example in response to a purchase, from person-to-person, or the like. It should be appreciated that the object 304 may be left within the environment, for example for pickup by a person associated with that location (e.g., a homeowner or business owner to which the object is addressed).

The object 304 includes a visual indicia 306 on the outer surface of the object 304. In some embodiments, the visual indicia 306 is printed or otherwise rendered onto the outer surface of the object 304. Additionally or alternatively, in some embodiments, the visual indicia 306 is included on a label or other material attached to the outer surface of the object 304. For example, in some embodiments, the object 304 includes a shipping label attached to the outer surface of the object 304 via an adhesive or other known means, where the shipping label includes the visual indicia printed and/or otherwise rendered thereupon. It should be appreciated that, in other embodiments, the visual indicia 306 may otherwise be provided together with or associated with the object 304, for example on a tag or printed material provided together with the object 304.

In some embodiments, the visual indicia 306 represents one or more pieces of information associated with the object 304 via any number of machine readable symbologies. For example, in at least some embodiments, the visual indicia 306 represents an encoding of one or more of: an object identifier associated with the object 304, an origination location, a destination location, and/or other information useful and/or otherwise needed for processing the object 304 as it is shipped between locations. In some embodiments, the visual indicia 306 includes only one type of machine readable symbology, for example a barcode or QR Code. In other embodiments, the visual indicia 306 includes a plurality of machine readable symbologies, which may be of the same or different encoding type. For example, in some embodiments, the visual indicia 306 includes multiple symbologies having one or more symbology types, each symbology representing different information associated with the object 304 (e.g., a first symbology representing origination location, a second representing destination location, a third representing an object identifier, and/or the like). Additionally or alternatively, in some embodiments, the visual indicia 306 includes a plurality of symbologies associated with a plurality of symbology types, such as where the visual indicia 306 encodes such delivery information into a first symbology having a first symbology type, a second symbology having a second symbology type, and the like. In this regard, each symbology may include the same information to enable redundancy, such as in a circumstance where one of the symbologies is damaged during the delivery process.

The imaging apparatus 302 may be configured to capture and/or process various image data objects for use in facilitating updates a delivery status of the object 304 and providing automatic proof of delivery. In some embodiments, the imaging apparatus 302 is embodied by a multi-sensor imaging apparatus, such as the apparatus 100, having the capabilities to capture image data objects associated with one or more field of views. In some such embodiments, the various image sensors may each be designed to capture a particular field of view, such that the resulting image data object captured by a given image sensor may be utilized for a particular intended purpose.

For example, as illustrated, the imaging apparatus 302 is configured for capturing in accordance with two depicted field of views, specifically a narrower field of view 308 and a broader field of view 310. In some embodiments, each field of view capable of being captured by the imaging apparatus 302 is defined by at least one image sensor of the imaging apparatus 302 together with field capture optics, such that light within the field of view may flow through the field capture optics and is captured by the at least one corresponding image sensor. In this regard, it should be appreciated that the field capture optics may be designed to define the desired field of views to be any of a myriad of angles as desired. For example, in this regard, the narrower field of view 308 is associated with a smaller field of view angle as compared to the broader field of view 310 with respect to the imaging apparatus 302. In at least one example embodiment, the narrower field of view 308 is associated with a far-field imager including a far-field image sensor associated with far-field capture optics, and the broader field of view 310 is associated with a near-field imager including a near-field image sensor associated with near-field capture optics. In this regard, the far-field imager may be intended for use in capturing image data objects for use as captured-indicia image data objects, and the far-field imager may be intended for use in capturing delivery proof image data objects.

The imaging apparatus 302 may be configured to capture an image data object that represents the field of view using the image sensor corresponding to each field of view. In this regard, the imaging apparatus 302 may be configured to capture an image data object set including at least a first image data object associated with the narrower field of view 308 and a second image data object associated with the wider field of view 310. In some embodiments, the imaging apparatus 302 may be configured to begin capturing the image data object set automatically, for example upon activation by a human operator or a system through one or more received signals, at a predetermined or determined capture rate. Alternatively or additionally, in some embodiments, the imaging apparatus 302 is configured to capture the image data object set in response to receiving user interaction with the imaging apparatus 302. For example, the imaging apparatus 302 may include a button, trigger, or other peripheral to enable the user to interact and initiate such capturing. In an example context, a system and/or human operator may initiate capturing for purposes of scanning the visual indicia to update a delivery status associated with the object 304 and automatically provide proof of delivery.

After capture, the imaging apparatus 302 may process one or more of the image data objects representing the narrower field of view 308 and the broader field of view 310. For example, in at least one example embodiment, the captured image data object representing the narrower field of view 308 may be processed to attempt to detect and decode visual indicia within the captured image data object. In this regard, the imaging apparatus 302 may be configured to process an image data object representing the narrower field of view 308 to identify whether the captured image data object includes the visual indicia 306. It should be appreciated that the imaging apparatus 302 may be configured to perform any of a number of known algorithms for detecting the visual indicia 306 within the captured image data object, such as various detection algorithms associated with one or more symbology types.

As such, the imaging apparatus 302 may continue to capture image data objects representing the narrow field of view 308 until a captured-indicia data object is captured including the visual indicia (as detected by processing each captured image). After detecting the visual indicia 306, the imaging apparatus 302 may proceed to decode the visual indicia 306 to identify delivery information represented by the visual indicia. It should be appreciated that the visual indicia 306 may be decoded using any of myriad of known decoding algorithms. In this regard, the imaging apparatus 302 may be configured to perform any number of decoding algorithms for one or more symbology types. In some embodiments, the imaging apparatus 302 identifies a symbology type associated with the visual indicia 306 when detecting the visual indicia 306, and subsequently initiates a corresponding decoding algorithm for the symbology type to decode the visual indicia. In some embodiments, the imaging apparatus 302 is configured such that, in a circumstance where the visual indicia 306 cannot be successfully decoded, the imaging apparatus 302 discards the captured image data object and continues to capture at least one new image data object for processing.

The delivery information may include various package information, shipping information, and/or the like, for use in the delivery process. The imaging apparatus 302 may identify the delivery information by decoding the visual indicia 306, and utilize the delivery information for performing one or more actions with respect to updating and/or storing data related to delivery of the object 304. For example, the imaging apparatus 302 may utilize an object identifier identified in the delivery information decoded from the visual indicia 306 for transmitting one or more requests to store a delivery proof image data object associated with the object identifier in a delivery management system and/or updating a delivery status associated with the object identifier in a delivery management system.

In some embodiments, the second image sensor capturing a second image data object representing the broader field of view 310 is utilized in a circumstance where a captured-indicia image data object is captured, for example via the first image sensor, and the imaging apparatus successfully decodes the visual indicia. In some embodiments, the second image data object representing the broader field of view 310 is utilized as a delivery proof image data object. In this regard, the captured delivery proof image data object may include data representing one or more features of the environment 300, and/or aspects thereof, such that the image data object may be provide sufficient proof that the object 304 was delivered to the location represented by the environment 300.

In this regard, each captured-indicia image data object representing the narrower field of view 308 may correspond to a delivery proof image data object representing the broader field of view 310. As such, the corresponding delivery proof image data object stored to a delivery management system for use as a proof of delivery of the object 304. In this regard, the imaging apparatus 302 may identify the object identifier within delivery information decoded from the visual indicia 306 captured within the captured-indicia image data object, and subsequently process the delivery proof image data object for use as a proof of delivery associated with the object 304. In this regard, the imaging apparatus 302 may at least transmit, to an external system, the delivery proof image data object in a request to store the delivery proof image data object together with the object identifier identified via decoding the visual indicia.

In some embodiments, the imaging apparatus 302 is configured to capture the image data objects simultaneously, or near-simultaneously within a desired threshold. In this regard, once a captured-indicia data object is captured and the visual indicia detected and/or decoded, the corresponding delivery proof image data object may be identified from the other sensor and represent the broader field of view 310 at the same moment, or nearly the same moment, the visual indicia was captured for successful decoding. Alternatively, in some embodiments, the image sensor corresponding to the broader field of view 310 may not be activated to capture the delivery proof image data object until the visual indicia is successfully decoded. In some such embodiments, upon successfully decoding the captured-indicia image data object, the imaging apparatus 302 may subsequently identify a delivery proof image data object by capturing it using a predetermined image sensor. As such, the delivery proof image data object may be captured for processing without subsequent user interaction by a human operator upon successfully decoding the visual indicia. Additionally or alternatively, the delivery proof image data object represents the broader field of view 310 at the same moment as, or nearly the same moment, as the image data object representing the narrower field of view 308. The automatic nature of the capture and association of the delivery proof image data object with the decoding of the visual indicia from the captured-indicia image data object (e.g., successful scanning of the machine readable symbology) reduces or eliminates the errors and false proof risks associated with conventional methodologies and implementations for proof of delivery.

In some embodiments, upon successfully decoding the visual indicia, the imaging apparatus 302 is configured to process the delivery proof image data object for user as a proof of delivery. In some embodiments, the imaging apparatus 302 transmits at least the delivery proof image data object to an external system for storage in a delivery management system together with an object identifier corresponding to the object 304. The imaging apparatus 302 may identify the object identifier from the delivery information decoded from the visual indicia 306, and transmit the object identifier to the delivery management system, directly or indirectly, such that the delivery management system is capable of processing the object identifier to determine a data record in which the delivery proof image data object should be stored for proof of delivery. When the delivery management system is later accessed, for example by one or more users seeking proof of delivery and/or by one or more administrators for auditing purposes, the delivery proof image data object for the object identifier corresponding to the object 304 may be retrieved from the record and analyzed and/or processed to indicate the object 304 was successfully delivered to the location represented by environment 300.

FIG. 4 depicts yet another example of an imaging apparatus operating in an example environment in accordance with at least one example embodiment of the present disclosure. Specifically, FIG. 4 again depicts the example environment 300, which includes the door 312, floor 314, and object 304 being delivered. FIG. 4 further includes another imaging apparatus, imaging apparatus 402, for capturing image data objects representing the environment 300. Specifically in this regard, the imaging apparatus 402 is configured to capture image data objects representing the broader field of view 310. For example, in some embodiments, the imaging apparatus 402 may be configured to capture an image data object representing the broader field of view 310 using a near-field image sensor in conjunction with corresponding field capture optics. As such, the imaging apparatus 402 may include the same components as the imaging apparatus 302, but be programmed to function different with respect to image capture via the image sensors therein.

In some such embodiments, the imaging apparatus 402 is configured to utilize the image sensor corresponding to the broader field of view 310 to capture one or more image data objects for a plurality of purposes. For example, in some embodiments, the imaging apparatus 402 captures an image data object set including an image data object to be used for visual indicia detection and/or decoding as well as proof of delivery. In this regard, in some such embodiments, the image data object includes sufficient data representing the visual indicia 306 that the visual indicia 306 can be detected and decoded from the image data object. Additionally in this regard, in some such embodiments, the image data object includes sufficient data representing features of the environment 300, for example one or more aspects of the door 312 and/or one or more aspects of the floor 314, that the image data object may be used for proof of delivery. As such, the single captured image data object be considered both a captured-indicia image data object and a delivery proof image data object, without requiring image data objects captured by a second image sensor (e.g., the image sensor associated with the narrower field of view 308 depicted with respect to FIG. 3).

In some embodiments, the imaging apparatus 402 is configured to detect and/or decode the visual indicia 306 when the visual indicia 306 is of a sufficient size. In this regard, the image sensor of the imaging apparatus 402 may be configured to capture the visual indicia 306 at a certain threshold distance such that the image data embodying the visual indicia 306 is sufficient for detecting and/or decoding. In some such embodiments, the imaging apparatus 402 is configured to attempt to scan the visual indicia 306 by capturing image data objects, using the single image sensor associated with the broader field of view 310 such as a near-field image sensor, and attempting to detect and decode the visual indicia 306. In circumstances where the imaging apparatus 402 fails to detect and/or decode the visual indicia 306 from such captured image data objects, the imaging apparatus 402 may be configured to attempt scanning utilizing two or more image sensor, such as a near-field image sensor and a far-field image sensor, as described above with respect to FIG. 3.

The imaging apparatus 402 may subsequently process the captured image data object for both purposes of decoding the visual indicia 306 and use for proof of delivery. By utilizing only a single image sensor for both purposes, such embodiments may, as an example, advantageously reduce the power requirements of such embodiments and/or improve the overall throughput of processing performed by such embodiments. Additionally or alternatively, in some embodiments, the imaging apparatus 402 is configured to utilize the second image sensor (e.g., associated with the narrower field of view 308) in a circumstance where the visual indicia cannot be successfully decoded from the image data object representing the broader field of view 310. For example, in some embodiments, the imaging apparatus 402 is configured to capture the image data object using a first image sensor, such as a near-field image sensor, associated with the broader field of view 310 and only utilize a second image sensor, such as a far-field image sensor, associated with a narrower field of view 308 in a circumstance where the image data object captured by the first image sensor cannot be successfully decoded. In this regard, the second image sensor (e.g., the far-field image sensor) may serve as a backup to the near-field image sensor for purposes of detecting and decoding the visual indicia 306. In some embodiments, in a circumstance where the imaging apparatus 402 cannot successfully decode the image data object captured by the image sensor associated with the broader field of view 310, that captured image data object may be utilized as the delivery proof image data object, for example in a circumstance the imaging apparatus 402 successfully decodes the visual indicia from a corresponding second image data object captured utilizing a second image sensor. By utilizing a particular image sensor for such processes when possible while utilizing the second image sensor as a backup, such embodiments reduce the likelihood of errors associated with visual indicia decoding and thus reduce the likelihood that subsequent image data objects will have to be captured because of failed decoding while reducing the power consumption and improving throughput (in at least one context) as compared to embodiments that consistently rely on a plurality of image sensors.

Example Operations for Automatic Proof of Delivery

Having described example apparatuses, systems, and operational contexts associated with embodiments of the present disclosure, example flowcharts including various operations performed by the above described apparatuses and/or systems will now be discussed. It should be appreciated that each of the flowcharts depicts an example computer-implemented process that may be performed by one, or more, of the above described apparatuses, systems, or devices, for example using one or more of the components described therein. Accordingly, each flowchart may define a process, or sub-process, for automatic proof of delivery. The blocks may be arranged in any of a number of ways as described and may include some or all of the steps described and/or depicted. In regard to the below flowcharts, one or more of the depicted blocks may be optional in some, or all, embodiments of the present disclosure. Optional blocks are depicted with broken (dashed) lines.

It should be appreciated that the particular operations depicted and described below with respect to FIGS. 5, 6A, 6B, and 7-11 illustrate specific operations or steps that may be performed in a particular process. Further, the process may be implemented by computer hardware, software, firmware, or a combination thereof, of a system, apparatus, device, or the like, as a computer-implemented method. In other embodiments, the various blocks may represent actions capable of being performed by one or more specially programmed components of such systems, apparatuses, devices, or the like. For example, computer-coded instructions may be specially programmed and stored as accessible for execution by one or more processors of an apparatus, system, device, or the like, for performing the various operations depicted apparatus. In this regard, for example, the computer-coded instructions may be stored on one or more non-transitory memory devices associated with the processor(s), which may be located in the apparatus, device, system, or the like, or otherwise made accessible. In other embodiments, computer program code capable to configure computing hardware, for example a processor, for performing the operations depicted by the various blocks may be stored to one or more non-transitory memory devices associated with a computer program product or other computer readable storage medium.

In some embodiments, it should be appreciated that the operations described herein are performed by an imaging apparatus, for example a multi-sensor imaging apparatus including a plurality of image sensors, and in some embodiments corresponding illumination sources, in communication with one or more processors. In some such embodiments, the user may interact with the imaging apparatus, for example directly via one or more buttons or other peripherals attached to the imaging apparatus or indirectly via an external device such as a smartphone, tablet, computer, or other user device synced with the imaging apparatus. In other embodiments, an imaging apparatus performs one or more of the identified computer-implemented processes automatically, for example as part of an automatic delivery system. It should be appreciated that all such embodiments are to be within the scope of the disclosure herein, and within the scope covered by the appended claims.

FIG. 5 illustrates an example process for automatic, or semi-automatic, proof of delivery. The example process illustrated may be performed by an imaging apparatus, for example the imaging apparatus 100 via the various components therein. In some such embodiments, the imaging apparatus 100 includes a specially programmed processor, such as the processor 108, to perform the operations depicted alone and/or together with one or more of the other depicted components. Additionally or alternatively, in some embodiments, the process illustrated may be performed by the imaging apparatus 302 or imaging apparatus 402. In some embodiments, the imaging apparatus includes or otherwise is in communication with one or more other apparatuses, systems, devices, or the like, to facilitate one or more of the operations described with respect to the illustrated process.

At optional block 502, the imaging apparatus includes means, such as the processor 108 and/or one or more peripherals and/or input components, or the like, configured to receive user input indicating a request to begin capturing image data objects. In some embodiments, the imaging apparatus receives the user input in response to user engagement with a button, trigger, or other component of the imaging apparatus designated to activate the imaging apparatus for purposes of initiating scanning, such as initiating scanning for visual indicia. In some embodiments, the user engagement may cause an activation signal to a processor, such as the processor 108, where the activation signal represents the user request to begin capturing the image data objects. In other embodiments, the imaging apparatus receives an activation signal automatically from a connected external system, such as a delivery management system or external system configured to enable control of the imaging apparatus. In response to receiving the user input indicating a request to begin capturing image data objects, the imaging apparatus may initiate a process to activate one or more image sensors and/or corresponding illumination sources to enable capture of image data objects using such image sensors.

In other embodiments, the imaging apparatus is activated by any of a myriad of other activation means. For example, in some embodiments, the imaging apparatus is configured to determine a distance between the imaging apparatus and an object, for example using one or more distance detection algorithms. Some such distance detection algorithms may be known in the art. In some such embodiments, the imaging apparatus may be configured to determine whether the measured distance between the imaging apparatus and the object is below an activation threshold, and activate in a circumstance where the distance is determined to satisfy the activation threshold, such as by being below the activation threshold or within an activation threshold range.

Additionally or alternatively, in some embodiments the imaging apparatus is configured to automatically activate to begin capturing upon determining the imaging apparatus is no longer in motion or is moving at a rate that satisfies an activation movement threshold. In this regard, the imaging apparatus may be configured to determine the velocity and/or speed at which the imaging apparatus is traveling. The velocity and/or speed may be determined using any of a number of movement calculation algorithms, some of which are known in the art. In some such embodiments, the imaging apparatus is configured to compare the determined velocity and/or speed to an activation movement threshold and activate if determined that the speed and/or velocity satisfies the activation movement threshold (for example, by the speed and/or velocity of the imaging apparatus being below the activation movement threshold).

In yet other embodiments, the imaging apparatus is configured to automatically scan for visual indicia. In some such embodiments, the imaging apparatus may continuously captures image data objects for processing. Each of the captured image data objects may be processed to determine whether a visual indicia is detectable within. In some such embodiments, the imaging apparatus may be activated to continue the operations described herein upon detecting a captured-indicia image data object including the visual indicia.

At block 504, the imaging apparatus includes means, such as the processor 108, one or more image sensors, or the like, configured to capture an image data object set utilizing at least one of an image sensor set, where the image data object set includes at least one image data object and includes at least a captured-indicia image data object including a visual indicia. In some embodiments, in addition to at least the captured-indicia image data object, the image data object set includes a delivery proof image data object. Some embodiments may utilize one image sensor of the image sensor set, a subset of the image sensors in the image sensor set, or all of the image sensors in the image sensor set to capture the image data object set. In some embodiments, the imaging apparatus is configured to capture the image data object set via one of the processes described below with respect to FIG. 8, FIG. 9, or FIG. 10.

In some embodiments, the image data object set includes the one image data object embodying the captured-indicia image data object. In some embodiments, the imaging apparatus is configured to capture image data objects, using one or more image sensors, and process such captured image data objects until the visual indicia is detected within the captured image data object (e.g., where the image data object including the visual indicia is the captured-indicia image data object). In some embodiments, the imaging apparatus utilizes an image sensor, of the image sensor set, that is particularly designed and/or configured for capturing image data objects most likely to include sufficient data for successfully detecting and decoding the visual indicia. For example, the imaging apparatus may utilize a far-field image sensor, and/or corresponding far-field illumination source, that captures a narrow field of view that can be focused on the visual indicia. In other embodiments, the imaging apparatus utilizes another image sensor, of the image sensor set, that captures image data objects representing a broader field of view (e.g., a near-field image sensor) for processing. The image data objects representing the broader field of view may be processed to determine whether a visual indicia can be successfully detected and/or decoded from the captured image data object. In some embodiments, in a circumstance where the imaging apparatus successfully detects a visual indicia in the captured image data object and successfully decodes the visual indicia, the image data object is used as both a captured-indicia image data object and a delivery proof image data object. In some embodiments, in a circumstance where the imaging apparatus either cannot successfully detect a visual indicia or cannot successfully decode the visual indicia, the imaging apparatus may utilize a second image sensor, such as a far-field image sensor, to attempt to capture a captured-indicia image data object from which the visual indicia may be detected and subsequently decoded. In some such embodiments, the first image data object captured by the image sensor associated with the broader field of view, such as the near-field image sensor, may be kept and processed as the delivery proof image data object, as described below.

At block 506, the imaging apparatus includes means, such as the processor 108, supporting hardware and/or software, an external system, and/or the like, to decode the visual indicia. The imaging apparatus may decode the visual indicia using any of a number of known decoding algorithms. In some embodiments, the imaging apparatus is configured to identify a symbology type associated with the visual indicia, for example upon detecting the visual indicia, and determine a corresponding decoding algorithm to utilize for decoding (e.g., detect the visual indicia is a QR Code, and thus perform a corresponding QR Code decoding algorithm). In this regard, the imaging apparatus may decode the visual indicia to identify delivery information represented by the visual indicia. In this regard, the imaging apparatus may identify any of a number of values represented therein, including without limitation an object identifier. Additionally or alternatively, in some embodiments, the delivery information decoded from the visual indicia includes a destination location and/or origination location associated with the object identified by the object identifier. Additionally or alternatively, in some embodiments, the delivery information decoded from the visual indicia includes volumetric or other physical parameters associated with the object identified by the object identifier, such as a length, width, and/or height measurement for the object, a radius for the object, a weight measurement of the object, or a combination thereof. In other embodiments, additionally or alternatively, it should be appreciated that any necessary or useful information for performing proof of delivery and/or delivery status updates for an object may be represented via the delivery information encoded by the visual indicia. The delivery information may be used in performing one or more actions for proof of delivery, as described herein. For example, the delivery information may be used to cause a delivery management system to store a delivery proof image data object associated with a particular object identifier, such that the delivery proof image data object may be used as a proof of delivery for the object corresponding to the object identifier. Additionally or alternatively, the delivery information may be used in performing a delivery status update, such as by updating one or more values of delivery status data based on the decoded delivery information.

In some embodiments, one or more image data objects captured by a far-field image sensor are first processed to attempt to detect and decode visual indicia therein. In some such embodiments, in a circumstance where the visual indicia is not successfully detected and decoded from the image data objects captured by the far-field image sensor, the imaging apparatus is configured to capture one or more image data objects using a near-field image sensor and attempt such processing. In some such embodiments, the imaging apparatus successfully detects and decodes the visual indicia from an image data object captured by the near-field image sensor (a captured-indicia image data object). In some such embodiments, the near-field image sensor may also be used for capturing the delivery proof image data object, such that no image data objects captured by the far-field image sensor are utilized in completing a successful scanning operation.

At optional block 507, the imaging apparatus includes means, such as processor 108, one or more image sensors, and/or the like, to capture at least one additional image data object of the image data object set utilizing at least one image sensor of the image sensor set. For example, in some embodiments the imaging apparatus is configured to capture at least a delivery proof image data object after successfully decoding the visual indicia. The additional captured image data object(s) may be captured using the same and/or different image sensors of the image sensor set utilized to capture the one or more image data objects at an earlier block, for example at block 504. For example, in some embodiments, a near-field image sensor is utilized to capture at least a delivery proof image data object utilizing a predetermined image sensor, such as a near-field image sensor, for such an operation. For example, in some such embodiments, the near-field image sensor may be utilized to capture the delivery proof image data object regardless of the image sensor utilized to capture the captured-indicia image data object that was successfully decoded. In some embodiments, for example where captured-indicia image data object was captured earlier using an image sensor predetermined or determined for use in capturing a delivery proof image data object, no subsequent image data objects may be captured and flow may continue to block 508.

At block 508, the imaging apparatus includes means, such as the processor 108, one or more image sensors, and/or the like, to identify a delivery proof image data object from the image data object set. In some embodiments, the imaging apparatus is configured to utilize a first image sensor associated with a narrower field of view (e.g., a far-field image sensor) to capture a captured-indicia image data object and utilize a second image sensor associated with a broader field of view (e.g., a far-field image sensor) to capture a corresponding delivery proof image data object associated with the captured-indicia image data object. In this regard, in some such embodiments, the imaging apparatus is configured to identify the delivery proof image data object from the image data object set based on the captured-indicia image data object. For example, the imaging apparatus may capture the captured-indicia image data object and the delivery proof image data object at the same time or substantially the same time, and associate the image data objects in the image data object set (e.g., by some mathematical relationship, as a tuple, or the like) such that the delivery proof image data object corresponding to the successfully decoded captured-indicia image data object may be identified within the set. In other embodiments, the imaging apparatus is configured to identify the captured-indicia image data object as the delivery proof image data object, such that the image data object serves both purposes. The imaging apparatus may utilize the captured-indicia image data object as the delivery proof image data object in circumstances where the captured-indicia image data object was captured by an image sensor associated with a broader field of view (e.g., a near-field image sensor) determined or predetermined to be sufficient for use as a proof of delivery, and was also successfully decoded by the imaging apparatus.

In other embodiments, the imaging apparatus is configured to identify a delivery proof image data object from the image data object set by capturing the delivery proof image data object after successfully decoding the visual indicia within the captured-indicia image data object. In this regard, in some embodiments at block 508, the imaging apparatus is configured to activate a predetermined image sensor associated with capturing image data objects for use as delivery proof image data objects. For example, in some embodiments, the imaging apparatus is configured to activate an image sensor associated with a broader field of view (e.g., a near-field image sensor) and identify the captured image data object as the delivery proof image data object associated with the captured-indicia image data object.

At block 510, the imaging apparatus includes means, such as the processor 108, communications module, and/or the like, to process the delivery proof image data object for use as a proof of delivery. In some embodiments, to process the delivery proof image data object, the imaging apparatus may store the delivery proof image data object in one or more locally managed datastore. In this regard, the delivery proof image data object may be stored via a local memory device of the imaging apparatus. Additionally or alternatively, in some embodiments, the delivery proof image data object is transmitted to one or more external devices, systems, apparatuses, or the like. In this regard, to process the delivery proof image data object for use as a proof of delivery for a delivered object, for example, the imaging apparatus may cause storage of at least the delivery proof image data object in a delivery management system. In this regard, the imaging apparatus may transmit data to one or more external systems (e.g., directly to the delivery management system, or to an intermediary device in communication with the delivery management system). Examples processes for processing the delivery proof image data object for use as a proof of delivery are described below with respect to FIGS. 6A, 6B, and 7.

In some embodiments, to process the delivery proof image data object the imaging apparatus is configured to output at least one image data object, for example the delivery proof image data object or an image data object derived therefrom, to one or more external system(s). During output to the at least one image data object, the imaging apparatus may utilize some or all of the delivery information. For example, the delivery information may include an object identifier with which the delivery proof image data object is to be associated. Additionally or alternatively, the delivery information may include a URL for accessing, by the imaging apparatus or a corresponding intermediary device, a delivery management system. In this regard, one or more transmissions may be sent via the URL to initiate a delivery status update via the delivery management system, or to cause storage of the delivery proof image data object associated with the object identifier within a delivery management system.

In this regard, after block 510, the automatic proof of delivery process may be completed together with any corresponding delivery status updates automatically initiated in response to successfully decoding the visual indicia and/or outputting the delivery proof image data object. The delivery status update may cause a delivery management system to store data representing an updated location and/or delivery status associated with the object. For example, in some embodiments, an object identifier determined from the delivery information is utilized to transmit, directly or indirectly through an intermediary device, a specially configured request to a delivery management system. The specially configured request may be configured to cause the delivery management system to update a stored record corresponding to the object identifier to reflect a newly reached delivery location (e.g., which may be predetermined based on a known delivery path or identified from the delivery information) and/or a corresponding delivery status identifier. As such, in some embodiments, upon output of the delivery proof image data object for storage and/or updating, subsequent steps for proof of delivery are not needed or are otherwise rendered superfluous. Accordingly, the automatically performed process is, in some examples, less susceptible to human introduced errors and/or false proof provided with regard to delivered objects. In addition to improving the overall efficacy of the proof of delivery process, such implementations also improve overall efficiency of the package delivery process by reducing the number of steps before a delivery person may continue to a new delivery.

In some embodiments, after completion of block 510, the flow ends. In other embodiments after completion of block 510, the flow continues to an operation depicted in another flowchart. For example, in some embodiments, the flow continues to the beginning of any of the flows described herein with respect to FIGS. 6A, 6B, and FIGS. 7-11.

FIG. 6A illustrates additional operations for automatic, or semi-automatic, proof of delivery, specifically to process the delivery proof image data object for use as a proof of delivery. The example process illustrated may be performed by an imaging apparatus, for example the imaging apparatus 100 via the various components therein. In some such embodiments, the imaging apparatus 100 includes a specially programmed processor, such as the processor 108, to perform the operations depicted alone and/or together with one or more of the other depicted components. Additionally or alternatively, in some embodiments, the process illustrated may be performed by the imaging apparatus 302 or imaging apparatus 402. In some embodiments, the imaging apparatus includes or otherwise is in communication with one or more other apparatuses, systems, devices, or the like, to facilitate one or more of the operations described with respect to the illustrated process.

At block 602, the imaging apparatus includes means, such as the processor 108, associated communication modules, and/or the like, to output at least the delivery proof image data object to an external system. In this regard, the delivery proof image data object may be transmitted, directly or indirectly, to a delivery management system to cause storage of the delivery proof image data object associated with a particular object identifier. For example, in some embodiments, the imaging apparatus is configured to output a request including the delivery proof image data object. In other embodiments, the imaging apparatus outputs a request including the delivery proof image data object and the captured-indicia image data object as separate data objects. In other such embodiments, the imaging apparatus may output the delivery proof image data object and the captured-indicia image data object in any number of requests and/or transmissions. As described, in some embodiments, the delivery proof image data object, and/or captured-indicia image data object, is transmitted to an external system embodying the delivery management system. Alternatively or additionally, in some embodiments, the delivery proof image data object, and/or captured-indicia image data object, is transmitted to the an external system embodying an intermediary device in communication with a delivery management system. In this regard, the intermediary device may be configured to forward the delivery proof image data objects, and/or corresponding request information, to the delivery management system to cause the delivery management system to store the delivery proof image data object associated with an associated object identifier. The object identifier may be determined from the delivery information upon successfully decoding the visual indicia in an earlier operation, and subsequently included in a transmission to a delivery management system. Additionally or alternatively, in some embodiments, by outputting at least the delivery proof image data object to an external system, the imaging apparatus causes the delivery management system to initiate at least a delivery status update. In this regard, the delivery status update may similarly be performed based on delivery information, such as a destination location for the shipped object, included in the transmission to the external system and received by the delivery management system.

In some embodiments, after completion of block 602, the flow ends. In other embodiments after completion of block 602, the flow continues to an operation depicted in another flowchart. For example, in some embodiments, the flow continues to the another block depicted with respect to any of the flows described herein, for example in FIGS. 5, 6B, or FIGS. 7-11.

FIG. 6B illustrates additional operations for automatic, or semi-automatic, proof of delivery, specifically to process the delivery proof image data object for use as a proof of delivery. The example process illustrated may be performed by an imaging apparatus, for example the imaging apparatus 100 via the various components therein. In some such embodiments, the imaging apparatus 100 includes a specially programmed processor, such as the processor 108, to perform the operations depicted alone and/or together with one or more of the other depicted components. Additionally or alternatively, in some embodiments, the process illustrated may be performed by the imaging apparatus 302 or imaging apparatus 402. In some embodiments, the imaging apparatus includes or otherwise is in communication with one or more other apparatuses, systems, devices, or the like, to facilitate one or more of the operations described with respect to the illustrated process.

At block 652, the imaging apparatus includes means, such as the processor 108, associated communication module, and/or the like, to generate a combined image data object based on at least the captured-indicia image data object and the delivery proof image data object. In this regard, the combined image data object may include the data embodied within the captured-indicia image data object and the delivery proof image data object. The combined image data object may be embodied using a different file format as compared to the captured-indicia image data object and/or the delivery proof image data object. In this regard, the combined image data object may be embodied utilizing a file format configured for including data from any number of image data objects, such that the data from the captured-indicia image data object and/or the delivery proof image data object may be included in the combined image data object without requiring data editing, formatting or loss. As such, the combined image data object may be parsed to identify each of the image data objects therein. In some embodiments, the combined image data object appends the captured-indicia image data object with the delivery proof image data object, for example in a pre-defined order.

At block 654, the imaging apparatus includes means, such as the processor 108, associated communication modules, and/or the like, to output the combined image data object to an external system. In this regard, the combined image data object may be transmitted, directly or indirectly, to a delivery management system to cause storage of the combined image data object, or the delivery proof image data object parsed therefrom, associated with a particular object identifier. As described, in some embodiments, the combined image data object, for example together with and/or additional to one or more requests, is transmitted to an external system embodying the delivery management system. Alternatively or additionally, in some embodiments, the combined image data object is transmitted to the an external system embodying an intermediary device in communication with a delivery management system. In this regard, the intermediary device may be configured to forward the combined image data object, and/or corresponding request information, to the delivery management system to cause the delivery management system to store the combined image data object, or delivery proof image data object therein, associated with an associated object identifier such as an object identifier determined from the delivery information and included in a transmission or request.

In some embodiments, after completion of block 654, the flow ends. In other embodiments after completion of block 654, the flow continues to an operation depicted in another flowchart. For example, in some embodiments, the flow continues to one of the operations described in any of the flows described herein with respect to FIGS. 6A, and FIGS. 7-11.

FIG. 7 illustrates additional operations for automatic, or semi-automatic, proof of delivery. Specifically, FIG. 7 illustrates operations to process the delivery proof image data object for use as a proof of delivery based on an active image output mode. The example process illustrated may be performed by an imaging apparatus, for example the imaging apparatus 100 via the various components therein. In some such embodiments, the imaging apparatus 100 includes a specially programmed processor, such as the processor 108, to perform the operations depicted alone and/or together with one or more of the other depicted components. Additionally or alternatively, in some embodiments, the process illustrated may be performed by the imaging apparatus 302 or imaging apparatus 402. In some embodiments, the imaging apparatus includes or otherwise is in communication with one or more other apparatuses, systems, devices, or the like, to facilitate one or more of the operations described with respect to the illustrated process.

At block 702, the imaging apparatus includes means, such as the processor 108, and/or the like, to determine an active image output mode. The active image output mode may embody a value that represent a currently selected mode from a plurality of predefined modes, such that the image data objects are output in accordance with the mode represented by the active image output mode. For example, in some embodiments, the imaging apparatus is configured to be set to at least two modes: a combined image output mode for outputting a combined image data object, as described above, and an individual image output mode for outputting at least one image data object not in a combined format, as described above. In some embodiments, the imaging apparatus is configured to also maintain a digitally-set active image output mode. In this regard, the imaging apparatus may maintain representing the value for the active image output mode, and update the value based on a signal received via user interaction with the imaging apparatus or received automatically from an external system. In other embodiments, the imaging apparatus is configured for determining the active image output mode based on an analog signal, for example set via a switch or multi-value component integrated with the imaging apparatus.

In some embodiments, the flow continues based on the value of the active image output mode. For example, in some embodiments, in a circumstance where the active image output mode represents a combined image output mode, the flow continues to block 704. At block 704, flow may continue to the process depicted with respect to FIG. 6B for outputting a combined image data object to an external system. The user may activate such a mode to enable one or more corresponding systems to receive, process, and/or store the image data objects together. Such a mode may enable an external system, such as a delivery management system, to store the delivery prof image data object and the captured-indicia image data object, or process the captured-indicia image data object such as to verify information therein.

Similarly, in a circumstance where the active image output mode represents an individual image output mode, the flow continues to block 706. At block 706, flow may continue to the process depicted with respect to FIG. 4A for outputting at least the delivery proof image data object. The user may activate such a mode to improve throughput of the imaging apparatus and/or minimize transmitted information between the imaging apparatus and external system. For example, in some such embodiments, in individual image output mode the imaging apparatus may be configured to output only a request, for example representing a request to store a delivery proof image data object, that includes the delivery proof image data object as the only captured image data object.

In some embodiments, the imaging apparatus may be configured (via analog or digital means) to enable the user to switch between various modes. For example the imaging apparatus may be configured to enable switching, via the user or automatically by a system, between a combined image output mode and an individual image output mode. In this regard the imaging apparatus may be configured, based on the active image output mode as described, to output the corresponding image data object(s) for each mode. In so doing, the imaging apparatus may output image data object(s) for use by an external system, such as a delivery management system, in further processing and/or storage actions. In some embodiments, the imaging apparatus may be configured to set the active image output mode to a predefined image output mode, where another image output mode may be activated for any of a number of desired purposes auditing, device testing, or the like.

In some embodiments, after completion of block 704 or 706, the flow ends. In other embodiments after completion of block 704 or 706, the flow continues to an operation depicted in another flowchart. For example, in some embodiments, the flow continues to one of the operations described in any of the flows described herein with respect to FIGS. 6A, 6B, and FIGS. 8-11.

FIG. 8 illustrates additional operations for automatic, or semi-automatic, proof of delivery, specifically to capture the image data object set using a near-field image sensor and far-field image sensor. The example process illustrated may be performed by an imaging apparatus, for example the imaging apparatus 100 via the various components therein. In some such embodiments, the imaging apparatus 100 includes a specially programmed processor, such as the processor 108, to perform the operations depicted alone and/or together with one or more of the other depicted components. Additionally or alternatively, in some embodiments, the process illustrated may be performed by the imaging apparatus 302 or imaging apparatus 402. In some embodiments, the imaging apparatus includes or otherwise is in communication with one or more other apparatuses, systems, devices, or the like, to facilitate one or more of the operations described with respect to the illustrated process.

At block 802, the imaging apparatus includes means, such as the processor 108, image sensors 106, and/or the like, to capture a captured-indicia image data object utilizing a far-field image sensor. The processor of the imaging apparatus may be configured to transmit an activation signal to the far-field image sensor to cause the far-field image sensor to capture an image data object. The captured image data objects may be transmitted from the far-field image sensor to the processor for processing, for example to attempt to detect visual indicia within the captured image data object (e.g., a captured-indicia image data object is captured). In some embodiments, the processor is configured to transmit such activation signals at a predefined rate, such that a plurality of image data objects are captured when activated until a visual indicia is successfully detected and decoded, for example indicating completion of a scanning operation.

In some embodiments, to capture the captured-indicia image data object utilizing the far-field image sensor at block 802, the imaging apparatus may activate a far-field illumination source associated with the far-field image sensor. In some embodiments, to activate the far-field illumination source associated with the far-field image sensor, the processor of the imaging apparatus may transmit an activation signal to the far-field illumination source. The activated far-field illumination source may provide illumination to a field of view associated with the far-field image sensor. The field of view associated with the far-field image sensor may be designed to encompass a desired projection size, at a predetermined ideal distance, that enables capture of at least the entirety of a visual indicia. It should be appreciated that the field of view angle associated with the far-field image sensor in conjunction with corresponding field capture optics may define the predetermined distance, such as the predetermined ideal distance, for capturing the captured-indicia image data object via the far-field image sensor.

At block 804, the imaging apparatus includes means, such as the processor 108, image sensors 106, and/or the like, to capture a delivery proof image data object utilizing a near-field image sensor. The processor of the imaging apparatus may be configured to transmit an activation signal to the near-field image sensor to cause the near-field image sensor to capture an image data object. The captured image data object may be utilized as a delivery proof image data object in response to successful capture, and/or subsequent decoding, of the visual indicia from the captured-indicia image data object. Upon capturing the delivery proof image data object, the delivery proof image data object may be transmitted from the near-field image sensor to the processor for processing, for example for output to an external system as described above. In some embodiments, the processor is configured to transmit such activation signals at a predefined rate, for example in conjunction with activation signals transmitted to a far-field image sensor. In other embodiments, the processor is configured to transmit an activation to the near-field image sensor in response to successfully capturing and/or decoding the captured-indicia image data object.

In some embodiments, to captured the delivery proof image data object utilizing the near-field image sensor at block 804, the imaging apparatus may activate a near-field illumination source associated with the near-field image sensor. In some embodiments, to activate the near-field illumination source associated with the near-field image sensor, the processor of the imaging apparatus may transmit an activation signal to the near-field illumination source. The activated near-field illumination source may provide illumination to a second field of view associated with the near-field image sensor. The second field of view associated with the near-field image sensor may be broader than the field of view associated with the far-field image sensor, such as by having a larger field of view angle, so as to encompass more of the environment surrounding the imaging apparatus at all distances. In this regard, the image data object captured by the near-field image sensor may include the visual indicia, a portion of the object, and/or a portion of the surrounding environment such that the image data object may be used as a delivery proof image data object. As such, due to the broader field of view, the near-field image sensor may capture more features when the far-field image sensor has successfully captured a captured-indicia image data object. The image data object set may include at least the captured-indicia image data object and the delivery proof image data object captured by the corresponding image sensors.

In some embodiments, after completion of block 804, the flow ends. In other embodiments after completion of block 804, the flow continues to an operation depicted in another flowchart. For example, in some embodiments, the flow continues to one of the operations described in any of the flows described herein with respect to FIGS. 6A, 6B, 7, and FIGS. 9-11.

FIG. 9 illustrates other additional operations for automatic, or semi-automatic, proof of delivery, specifically to capture the image data object set using a near-field image sensor. The example process illustrated may be performed by an imaging apparatus, for example the imaging apparatus 100 via the various components therein. In some such embodiments, the imaging apparatus 100 includes a specially programmed processor, such as the processor 108, to perform the operations depicted alone and/or together with one or more of the other depicted components. Additionally or alternatively, in some embodiments, the process illustrated may be performed by the imaging apparatus 302 or imaging apparatus 402. In some embodiments, the imaging apparatus includes or otherwise is in communication with one or more other apparatuses, systems, devices, or the like, to facilitate one or more of the operations described with respect to the illustrated process.

At block 902, the imaging apparatus includes means, such as the processor 108, image sensors 106, and/or the like, to capture a near-field image data object utilizing a near-field image sensor. In some such embodiments, the near-field image data object is used as the captured-indicia image data object and the delivery proof image data object. In this regard, the near-field image data object may be configured to enable capture of a near-field image data object with sufficient data such that the near-field image data object may be processed to detect and/or decode visual indicia therein. In some such embodiments, the near-field image data object is utilized for such purposes as opposed to capturing a second image data object via a far-field image sensor.

In addition to processing the near-field image data object as a captured-indicia image object, the near-field image data object is similarly used as a delivery proof image data object. In this regard, the near-field image data object may be processed by the imaging apparatus for outputting, for example to an external system. The near-field image data object may be associated with a sufficiently broad field of view such that one or more features of the environment associated with the imaging apparatus is/are captured such that the near-field image data object may be processed and/or analyzed to identify a location represented by the environment. Additionally, the near-field image sensor may of a sufficient resolution such that the near-field image sensor is configured to capture sufficient data to enable the imaging apparatus to detect and/or decode a visual indicia captured from a predetermined threshold distance and/or within a threshold range.

It should be appreciated that, by utilizing only one image sensor, the illustrated process reduces required power consumption and may improve throughput of the image processing performed by the imaging apparatus by reducing the number of actions performed by the user for completing a proof of delivery. In some embodiments, however, the imaging apparatus may be configured to utilize the far-field image sensor as a backup in a circumstance where a visual indicia cannot be successfully detected within a near-field image data object and/or cannot be successfully decoded upon detecting. In some such embodiments, the imaging apparatus may be configured to capture a predetermined number of near-field image data objects using a near-field image sensor, and if no visual indicia is successfully detected and/or decoded, capture one or a predetermined number of far-field image data object(s) using a far-field image sensor for processing. If a visual indicia similarly cannot be detected within and/or decoded from the far-field image data object(s), the imaging apparatus may return to capturing via the near-field image sensor. This cycle may continue until a visual indicia is successfully detected and decoded, until a system transmits a deactivation signal to the imaging apparatus, until a human operator deactivates the imaging apparatus (e.g., by releasing a trigger, button, or other peripheral), or the like.

In some embodiments, after completion of block 902, the flow ends. In other embodiments after completion of block 902, the flow continues to an operation depicted in another flowchart. For example, in some embodiments, the flow continues to one of the operations described in any of the flows described herein with respect to FIGS. 6A, 6B, 7-8, and FIGS. 10-11.

FIG. 10 illustrates additional operations for automatic, or semi-automatic, proof of delivery, specifically to capture the image data object set using a single image sensor of an image sensor set including any number of image sensors. The example process illustrated may be performed by an imaging apparatus, for example the imaging apparatus 100 via the various components therein. In some such embodiments, the imaging apparatus 100 includes a specially programmed processor, such as the processor 108, to perform the operations depicted alone and/or together with one or more of the other depicted components. Additionally or alternatively, in some embodiments, the process illustrated may be performed by the imaging apparatus 302 or imaging apparatus 402. In some embodiments, the imaging apparatus includes or otherwise is in communication with one or more other apparatuses, systems, devices, or the like, to facilitate one or more of the operations described with respect to the illustrated process.

At block 1002, the imaging apparatus includes means, such as the processor 108, an image sensor of the image sensors 106, and/or the like, to capture a single image data object utilizing the single image sensor, wherein the single image data object is used as the captured-indicia image data object and the delivery proof image data object. The single image sensor may be a middle sensor of the image sensor set. For example, in some embodiments, the single image sensor is associated with a field of view that is between a narrowest field of view associated with a first image sensor and a broadest field of view associated with a second image sensor. In this regard, the single image sensor may be predetermined, and/or otherwise selected, such that the field of view associated with the single image sensor is sufficient to enable the single image sensor to capture image data sufficient for detecting and/or visual indicia captured therein and for identifying a location represented by the captured environment. For example, in some embodiments, the single image sensor is a middle-field image sensor in a tri-sensor imaging apparatus including a near-field image sensor associated with a broadest near field of view, a far-field image sensor associated with a narrowest field of view, and a middle-field image sensor associated with a middle field of view between the narrowest field of view and broadest field of view. It should be appreciated that the middle field of view may be of a predetermined size such, from a predetermined distance, a visual indicia is successfully detected and decoded above a desired success threshold.

In some such embodiments, one or more other image sensors of the image sensor set may be utilized as backup sensors in circumstances where the single image data object cannot be successfully processed as a captured-indicia image data object and/or a delivery proof image data object. For example, in some embodiments, if a visual indicia cannot be successfully detected and/or decoded from the single image data object, an alternative image sensor associated with a narrower field of view (such as a far-field image sensor) may be utilized for capturing a second image data object utilized as a captured-indicia image data object. Alternatively or additionally, if the single image data object is determined not to include sufficient environmental data for use as a delivery proof image data object, an alternative image sensor associated with a broader field of view (such as a near-field image sensor) may be utilized for capturing a second image data object utilized as a delivery proof image data object. In this regard, the single image data object may function as a default based on a desired scanning success threshold while providing a desired level of environment data.

In some embodiments, after completion of block 1002, the flow ends. In other embodiments after completion of block 1002, the flow continues to an operation depicted in another flowchart. For example, in some embodiments, the flow continues to one of the operations described in any of the flows described herein with respect to FIGS. 6A, 6B, 7-9, and FIG. 11.

FIG. 11 illustrates another example process for automatic, or semi-automatic, proof of delivery. The example process illustrated may be performed by an imaging apparatus, for example the imaging apparatus 100 via the various components therein. In some such embodiments, the imaging apparatus 100 includes a specially programmed processor, such as the processor 108, to perform the operations depicted alone and/or together with one or more of the other depicted components. Additionally or alternatively, in some embodiments, the process illustrated may be performed by the imaging apparatus 302 or imaging apparatus 402. In some embodiments, the imaging apparatus includes or otherwise is in communication with one or more other apparatuses, systems, devices, or the like, to facilitate one or more of the operations described with respect to the illustrated process.

At block 1102, the imaging apparatus includes means, such as the processor 108, one or more image sensors, and/or the like, configured to capture a captured-indicia image data object using a far-field image sensor, the captured-indicia image data object including a visual indicia. The far-field image sensor may be configured to capture image data objects while activated and process the captured image data objects to attempt to detect a visual indicia therein. In this regard, the captured-indicia image data object may be identified upon successfully detecting the visual indicia within the captured image data object. The far-field image data object may be associated with a narrow field of view for capturing detailed data representing the visual indicia. As such, the image sensor, in combination with corresponding field capture optics, may be focused on for capturing such data from a predetermined distance, or within a predetermined threshold distance range. In some embodiments, the imaging apparatus is configured to capture one or more image data objects, including the captured-indicia image data object, upon activation via any of a number of activation means as described herein. Non-limiting examples of such activation means include activation by user input, automatic activation signal received from an external system, detecting that the imaging apparatus is within a predetermined threshold range from an object, and/or any combination thereof.

At block 1104, the imaging apparatus includes means, such as the processor 108, one or more of the image sensors, and/or the like, configured to decode the visual indicia to identify delivery information represented by the visual indicia. As described, the imaging apparatus may decode the visual indicia using any of a number of known decoding algorithms, for example by first identifying a symbology type associated with a detected visual indicia and determining a corresponding decoding algorithm to use. The imaging apparatus may identify any of a number of values for delivery information represented by the visual indicia, such as, but not limited to, an object identifier associated with the object linked to the visual indicia. It should be appreciated that, as described above, any of a variety of data included in the delivery information may be utilized for any of a myriad of actions, for example to process the delivery proof image data object for storing the delivery proof image data object associated with the object identifier in a delivery management system and/or initiating a delivery status update associated with the object identifier.

In some embodiments, the imaging apparatus is configured to process each image data object captured via the far-field image data object to determine whether a visual indicia is detected within the captured image data object and thus is usable as a captured-indicia image data object. In some such embodiments, based on the processing, to detect and/or decode the visual indicia, the imaging apparatus may determine and/or provide user instructions and/or activation signals for repositioning the imaging apparatus based on the processed data. For example, in a circumstance where the imaging apparatus determines the imaging apparatus is too far away to capture image data object(s) including a detectable and/or decodable visual indicia, the imaging apparatus may provide user instructions to reposition the imaging apparatus closer to an object. Additionally or alternatively, in some embodiments, the imaging apparatus is configured to automatically transmit activation signals to cause the imaging apparatus to be moved closer. For example, in some embodiments the imaging apparatus communicates with an automatic support structure that houses the imaging apparatus to cause the automatic support structure to reposition the imaging apparatus. It should be appreciated that, in an example circumstance where the imaging apparatus determines the imaging apparatus is too close, similar instructions and/or activation signals may be produced for moving the imaging apparatus away from the object.

At block 1106, the imaging apparatus includes means, such as the processor 108, one or more image sensors, and/or the like, configured to capture a delivery proof image data object using a near-field image sensor. The delivery proof image data object is captured with the imaging apparatus located at the same, or nearly the same point (e.g., within a small movement made within the time difference between capturing the captured-indicia image data object and the delivery proof image data object). The delivery proof image data object may include sufficient data representing the environment of the imaging apparatus, such that the data may be processed and/or analyzed to identify a location represented by the environment. The far-field image data object may be associated with a broader field of view as compared to the narrow field of view associated with the far-field image sensor. In this regard, the image data object captured by the near-field image sensor may be sufficient for such purposes without subsequent analysis and/or recapturing by the near-field image data object. As such, the near-field image sensor, in combination with corresponding field capture optics, may be focused on capturing broad field of view for capturing the environment of the imaging apparatus with sufficient detail for identifying features captured therein during analysis and/or processing when capturing such data from the predetermined distance, or within the predetermined threshold distance range.

In some embodiments, the imaging apparatus is configured to process each image data object captured via the near-field image sensor to determine whether the image data object includes sufficient environmental data. For example, in some embodiments, each image data object is processed to determine whether the object being captured, and/or associated label, visual indicia, and/or the like, represents above a threshold percentage of the image data object. In this regard, if the image data object includes above a percentage threshold of data dedicated to the object, it may be determined that the image data object does not include sufficient environmental feature data for use as a proof of delivery. Similarly, n some embodiments, in a circumstance where the image data object includes below a threshold of data dedicated to the object, the imaging apparatus may determine that the captured image data object includes sufficient environmental feature data for use as a proof of delivery. Additionally or alternatively, in some embodiments, the imaging apparatus may process the image data object to determine whether one or more features are detectable in the image data object. In some such embodiments, the imaging apparatus may utilize an image data object as a delivery proof image data object only when it is determined to include a certain number of features, certain required features, and/or the like. In some embodiments, processing the delivery proof image data object may utilize any number of machine learning implementations for purposes of determining whether the delivery proof image data object includes sufficient data for use as proof of delivery and/or for identifying environment features within the captured image data object.

In some such embodiments, based on the processing, the imaging apparatus may determine and/or provide user instructions and/or activation signals for repositioning the imaging apparatus as described above. For example, in a circumstance where the imaging apparatus determines the imaging apparatus is too close to capture sufficient environmental data for use as proof of delivery, the imaging apparatus may be configured to provide user instructions to reposition the imaging apparatus further from to an object. Additionally or alternatively, in some embodiments, the imaging apparatus is configured to automatically transmit activation signals to cause the imaging apparatus to be moved further from the object. It should be appreciated that, in some embodiments, these instructions together with the instructions described above with respect to capturing the captured-indicia image data object may be used to calibrate an optimal position for the imaging apparatus with respect to a particular object. For example, the imaging apparatus may begin far away from the object and can be brought closer until the visual indicia is detectable and decodable, thus maximizing the environmental data captured while still enabling successful scanning of the visual indicia.

At block 1108, the imaging apparatus includes means, such as the processor 108, a communications module, and/or the like, to output, to an external system, the delivery proof image data object, the delivery proof image data object and the captured-indicia image data object, or a combined data object generated based on at least the delivery proof image data object and the captured indicia image data object. For example, in some such embodiments, the imaging apparatus is configured for outputting as described above with respect to FIG. 6A. Alternatively or additionally, in some embodiments, the imaging apparatus is configured for outputting as described above with respect to FIG. 6B. In yet other embodiments, the imaging apparatus is configured for outputting as described above with respect to FIG. 7. Further, in some embodiments, the external system embodies an intermediary device in communication with a delivery management system, for example such that the imaging apparatus is configured to output by transmitting an image data object to the intermediary device, within or together with a request including at least a subset of the delivery information, to cause the intermediary device to forward such data to the delivery management system for processing. In other embodiments, the external system embodies the delivery management system, such that the imaging apparatus is configured to directly output one or more image data objects, within and/or together with a request including at least a subset of the delivery information, to cause the delivery management system to store at least a delivery proof image data object and/or initiate a delivery status update.

It should be appreciated that, in some embodiments, one or more of the above operations occur in response to a single signal. For example, in some embodiments, blocks 1102-1108 occur in response to user engagement with a button, peripheral, trigger, or other component for activating the imaging apparatus and/or otherwise beginning a scanning mode. Additionally or alternatively, in some embodiments, blocks 1102-1108 occur automatically in response to an activation signal from an external signal, for activating the imaging apparatus and/or otherwise beginning a scanning mode.

In some embodiments, the operations and/or components referenced with respect to FIG. 11 function similarly to those described with respect to FIG. 5. For example, in at least some embodiments, the apparatus includes a plurality of image sensors including at least the near-field image sensor and the far-field image sensor. Some such embodiments may include any number of image sensors each associated with a different field of view, for example three image sensors in a tri-sensor environment, four image sensors in a four-sensor environment, and the like. Additionally or alternatively, some embodiments are configured to output the delivery proof image data object, the delivery proof image data object and the captured-indicia image data object, or the combined data object to an external system for processing as the proof of delivery. Non-limiting examples of the external system include a delivery management system, or may be an intermediary system in communication with a delivery management system. Additionally or alternatively, some embodiments are configured to receive user input indicating a request to begin capturing using at least the far-field image sensor. Some such embodiments are configured to begin capture using one or more of the image sensors in response to the user input. In this regard, some such embodiments capture the captured-indicia image data object in response to receiving the user input. Additionally or alternatively, some embodiments are configured to determine an active image output mode for use in outputting corresponding image data object(s). Some such embodiments are configured to, in a circumstance where the active image output mode represents a combined image output mode, generate the combined image data object based on at least the captured-indicia image data object and the delivery proof image data object, and output the combined image data object. Additionally or alternatively, some such embodiments are configured to, in a circumstance where the active image output mode represents an individual image output mode, output at least the delivery proof image data object. Additionally or alternatively, some such embodiments are configured to cause a delivery status update in a delivery management system. In some such embodiments, the delivery status updated is caused in response to transmission of one or more image data objects. Additionally or alternatively, in some embodiments, the delivery status update is caused by transmission of a specially configured request transmitted with and/or in addition to the captured image data object(s) being output.

In some embodiments, after completion of block 1108, the flow ends. In other embodiments after completion of block 1108, the flow continues to an operation depicted in another flowchart. For example, in some embodiments, the flow continues to the beginning of any of the flows described herein with respect to FIGS. 5, 6A, 6B, and FIGS. 7-10.

Conclusion

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., a FPGA or an ASIC. The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous, as an example. Thus, particular embodiments of the subject matter have been described. Other embodiments are within the scope of the following claims. In some cases, the actions recited in the claims can be performed in a different order and still achieve desirable results. Moreover, the separation of various system components in the embodiments described above should not be understood as requiring such separation in all embodiments, and it should be understood that the described program components and systems can generally be integrated together in a single software product or packaged into multiple software products.

Some examples of methods, apparatuses, and computer program products that are described herein are as follows:

M1. There is provided a computer-implemented method for proof of delivery including capturing an image data object set utilizing at least one of an image sensor set, wherein the image data object set comprises at least one image data object, and wherein image data object set comprises a captured-indicia image data object comprising a visual indicia; decoding the visual indicia to identify delivery information represented by the visual indicia; identifying a delivery proof image data object from the image data object set; and processing the delivery proof image data object for use as a proof of delivery.

M2. There is also provided the method of (M1), wherein the set of image sensors comprises at least a near-field image sensor associated with a near field of view, and wherein the set of image sensors comprises at least a far-field image sensor associated with a far field of view, and wherein capturing the image data object set utilizing at least one of the image sensor set includes capturing a near-field image data object utilizing the near-field image sensor, wherein the near-field image data object is used as the captured-indicia image data object and the delivery proof image data object.

M3. There is also provided the method of (M1), wherein the set of image sensors comprises a single image sensor, and wherein capturing the image data object set utilizing at least one of the image sensor set includes capturing a single image data object utilizing the single image sensor, wherein the single image data object is used as the captured-indicia image data object and the delivery proof image data object.

M4. There is also provided the method of (M1), wherein processing the delivery proof image data object for use as a proof of delivery includes outputting at least the delivery proof image data object to an external system.

M5. There is also provided the method of (M1), the method further including receiving user input indicating a request to begin capturing the image data object set, wherein capturing the image data object set utilizing at least one of an image sensor set occurs in response to receiving the user input.

M6. There is also provided the method of (M1), wherein processing the delivery proof image data object for use as a proof of delivery includes determining an active image output mode; in a circumstance where the active image output mode represents a combined image output mode: generating a combined image data object based on at least the captured-indicia image data object and the delivery proof image data object; and outputting the combined image data object to an external system; and in a circumstance where the active image output mode represents an individual image output mode; and outputting at least the delivery proof image data object to an external system.

M7. There is also provided the method of (M1), further including causing a delivery status update in a delivery management system.

M8. There is also provided the method of (M1), wherein the set of image sensors comprises at least a near-field image sensor associated with a near field of view, and wherein the set of image sensors comprises at least a far-field image sensor associated with a far field of view, and wherein capturing the image data object set utilizing at least one of the image sensor set includes capturing the captured-indicia image data object utilizing the far-field image sensor; and capturing the delivery proof image data object utilizing the near-field image sensor.

M9. There is also provided the method of (M8), wherein the near field of view is broader than the far field of view in at least one direction.

M10. There is also provided the method of (M8), wherein processing the delivery proof image data object for use as a proof of delivery includes generating a combined image data object based on at least the captured-indicia image data object and the delivery proof image data object; and outputting the combined image data object to an external system.

M11. There is also provided the method of (M8), wherein capturing the delivery proof image data object utilizing the near-field image sensor occurs in response to decoding the visual indicia to identify delivery information represented by the visual indicia.

A1. In addition, there is provided an apparatus for proof of delivery, the apparatus comprising at least one processor and at least one non-transitory memory including computer program code, the at least one non-transitory memory and the computer program code, with the at least one processor, configure the apparatus to capture an image data object set utilizing at least one of an image sensor set, wherein the image data object set comprises at least one image data object, and wherein image data object set comprises a captured-indicia image data object comprising a visual indicia; decode the visual indicia to identify delivery information represented by the visual indicia; identify a delivery proof image data object from the image data object set; and process the delivery proof image data object for use as a proof of delivery.

A2. There is also provided the apparatus of (A1), wherein the set of image sensors comprises at least a near-field image sensor associated with a near field of view, and wherein the set of image sensors comprises at least a far-field image sensor associated with a far field of view, and wherein, to capture the image data object set utilizing at least one of the image sensor set, the apparatus is configured to capture a near-field image data object utilizing the near-field image sensor, wherein the near-field image data object is used as the captured-indicia image data object and the delivery proof image data object.

A3. There is also provided the apparatus of (A1), wherein the set of image sensors comprises a single image sensor, and wherein, to capture the image data object set utilizing at least one of the image sensor set, the apparatus is configured to capture a single image data object utilizing the single image sensor, wherein the single image data object is used as the captured-indicia image data object and the delivery proof image data object.

A4. There is also provided the apparatus of (A1) wherein, to process the delivery proof image data object for use as a proof of deliver, the apparatus is configured to output at least the delivery proof image data object to an external system.

A5. There is also provided the apparatus of (A1), the apparatus further configured to receive user input indicating a request to capture the image data object set, wherein the apparatus is configured to capture the image data object set utilizing at least one of an image sensor set occurs in response to receiving the user input.

A6. There is also provided the apparatus of (A1), wherein, to process the delivery proof image data object for use as a proof of delivery, the apparatus is configured to determine an active image output mode; in a circumstance where the active image output mode represents a combined image output mode: generate a combined image data object based on at least the captured-indicia image data object and the delivery proof image data object; and output the combined image data object to an external system; and in a circumstance where the active image output mode represents an individual image output mode: output at least the delivery proof image data object to an external system.

A7: There is also provided the apparatus of (A1), the apparatus further configured to cause a delivery status update in a delivery management system.

A8. There is also provided the apparatus of (A1), wherein the set of image sensors comprises at least a near-field image sensor associated with a near field of view, and wherein the set of image sensors comprises at least a far-field image sensor associated with a far field of view, and wherein, to capture the image data object set utilizing at least one of the image sensor set, the apparatus is configured to: capture the captured-indicia image data object utilizing the far-field image sensor; and capture the delivery proof image data object utilizing the near-field image sensor.

A9. The apparatus of (A8), wherein the near field of view is broader than the far field of view in at least one direction.

A10. The apparatus of (A8) wherein, to process the delivery proof image data object for use as a proof of delivery, the apparatus is configured to generate a combined image data object based on at least the captured-indicia image data object and the delivery proof image data object; and output the combined image data object to an external system.

A11. The apparatus of (A8), wherein the apparatus is configured to capture the delivery proof image data object utilizing the near-field image sensor in response to decoding the visual indicia to identify delivery information represented by the visual indicia.

P1. In addition, there is provided a computer program product for proof of delivery, the computer program product includes at least one non-transitory computer-readable computer storage medium having computer program instructions thereon, the computer program instructions, in execution with at least one processor, configured to capture an image data object set utilizing at least one of an image sensor set, wherein the image data object set comprises at least one image data object, and wherein image data object set comprises a captured-indicia image data object comprising a visual indicia; decode the visual indicia to identify delivery information represented by the visual indicia; identify a delivery proof image data object from the image data object set; and process the delivery proof image data object for use as a proof of delivery.

P2. There is also provided the computer program product of (P1), wherein the set of image sensors comprises at least a near-field image sensor associated with a near field of view, and wherein the set of image sensors comprises at least a far-field image sensor associated with a far field of view, and wherein, to capture the image data object set utilizing at least one of the image sensor set, the computer program product is configured to capture a near-field image data object utilizing the near-field image sensor, wherein the near-field image data object is used as the captured-indicia image data object and the delivery proof image data object.

P3. There is also provided the computer program product of (P1), wherein the set of image sensors comprises a single image sensor, and wherein, to capture the image data object set utilizing at least one of the image sensor set, the computer program product is configured to capture a single image data object utilizing the single image sensor, wherein the single image data object is used as the captured-indicia image data object and the delivery proof image data object.

P4. There is also provided the computer program product of (P1), wherein, to process the delivery proof image data object for use as a proof of deliver, the computer program product is configured to output at least the delivery proof image data object to an external system.

P5. There is also provided the computer program product of (P1), the computer program product further configured to receive user input indicating a request to capture the image data object set, wherein the computer program product is configured to capture the image data object set utilizing at least one of an image sensor set occurs in response to receiving the user input.

P6. There is also provided the computer program product of (P1), the computer program product further configured to cause a delivery status update in a delivery management system.

P7. There is also provided the computer program product of (P1), wherein, to process the delivery proof image data object for use as a proof of delivery, the computer program product is configured to determine an active image output mode; in a circumstance where the active image output mode represents a combined image output mode: generate a combined image data object based on at least the captured-indicia image data object and the delivery proof image data object; and output the combined image data object to an external system; and in a circumstance where the active image output mode represents an individual image output mode: output at least the delivery proof image data object to an external system.

P8. There is also provided the computer program product of (P1), wherein the set of image sensors comprises at least a near-field image sensor associated with a near field of view, and wherein the set of image sensors comprises at least a far-field image sensor associated with a far field of view, and wherein, to capture the image data object set utilizing at least one of the image sensor set, the computer program product is configured to capturing the captured-indicia image data object utilizing the far-field image sensor; and capturing the delivery proof image data object utilizing the near-field image sensor.

P9. There is also provided the computer program product of (P8), wherein the near field of view is broader than the far field of view in at least one direction.

P10. There is also provided the computer program product of (P8), wherein, to process the delivery proof image data object for use as a proof of delivery, the computer program product is configured to generate a combined image data object based on at least the captured-indicia image data object and the delivery proof image data object; and output the combined image data object to an external system.

P11. There is also provided the computer program product of (P8), wherein the computer program product is configured to capture the delivery proof image data object utilizing the near-field image sensor in response to decoding the visual indicia to identify delivery information represented by the visual indicia.

B1. In addition, there is provided yet another apparatus for proof of delivery, the apparatus including a near-field image sensor associated with a near field of view; a far-field image sensor associated with a far field of view, wherein the near field of view is broader than the far field of view; and a processor configured, by computer-coded instructions accessible to the processor, to capture a captured-indicia image data object using the far-field image sensor, the captured-indicia image data object comprising a visual indicia; decode the visual indicia to identify delivery information represented by the visual indicia; capture a delivery proof image data object using the near-field image sensor; and output, for processing as a proof of delivery, the delivery proof image data object, the delivery proof image data object and the captured-indicia image data object, or a combined data object generated based at least on the delivery proof image data object and the captured-indicia image data object.

B2. There is also provided the apparatus of (B1), wherein the apparatus comprises a plurality of image sensors comprising at least the near-field image sensor and the far-field image sensor.

B3. There is also provided the apparatus of (B1), wherein the processor is configured to output the delivery proof image data object, the delivery proof image data object and the captured-indicia image data object, or the combined data object to an external system for processing as the proof of delivery.

B4. There is also provided the apparatus of (B1), the processor further configured to receive user input indicating a request to begin capturing using at least the far-field image sensor, wherein the apparatus is configured to capture the image data object in response to receiving the user input.

B5. There is also provided the apparatus of (B1), wherein, to output the delivery proof image data object, the delivery proof image data object and the captured-indicia image data object, or the combined data object, the processor is configured to: determine an active image output mode; in a circumstance where the active image output mode represents a combined image output mode, generate the combined image data object based on at least the captured-indicia image data object and the delivery proof image data object; and output the combined image data object; and in a circumstance where the active image output mode represents an individual image output mode output at least the delivery proof image data object.

B6. There is also provided the apparatus of (B1), the processor further configured to cause a delivery status update in a delivery management system.

N1. In addition, there is provided yet another computer-implemented method for proof of delivery including capturing a captured-indicia image data object using a far-field image sensor associated with a far field of view, the captured-indicia image data object comprising a visual indicia; decoding the visual indicia to identify delivery information represented by the visual indicia; capturing a delivery proof image data object using a near-field image sensor associated with a near field of view, wherein the near field of view is broader than the far field of view; and outputting, for processing as a proof of delivery, the delivery proof image data object, the delivery proof image data object and the captured-indicia image data object, or a combined data object generated based at least on the delivery proof image data object and the captured-indicia image data object.

N2. There is also provided the computer-implemented of (N1), wherein outputting the delivery proof image data object, the delivery proof image data object and the captured-indicia image data object, or the combined data object comprises outputting the delivery proof image data object, the delivery proof image data object and the captured-indicia image data object, or the combined data object to an external system for processing as the proof of delivery.

N3. There is also provided the computer-implemented method of (N1), the method further comprising receiving user input indicating a request to begin capturing using at least the far-field image sensor, wherein the apparatus is configured to capture the image data object in response to receiving the user input.

N4. There is also provided the computer-implemented method of (N1), the method further comprising causing a delivery status update in a delivery management system.

What is claimed is:

1. An apparatus for proof of delivery, the apparatus comprising:
   a hand-holdable housing comprising:
   a near-field image sensor associated with a near field of view;
   a far-field image sensor associated with a far field of view, wherein the near field of view is broader than the far field of view, and wherein the broader field of view comprises the near field of view; and
   a processor configured, by computer-coded instructions accessible to the processor, to:
   capture a first indicia image data object using the far-field image sensor, the first indicia image data object comprising a visual indicia;
   decode the visual indicia to identify delivery information represented by the visual indicia;
   in response to successfully decoding the visual indicia in the first indicia image data object, activate the near-field image sensor;
   capture a delivery proof image data object using the near-field image sensor;
   output, for processing as a proof of delivery, a combined data object generated based at least on the delivery proof image data object captured using the near-field image sensor and the first indicia image data object captured using the far-field image sensor;
   in response to unsuccessfully decoding the visual indicia in the first indicia image data object, activate the near-field image sensor;
   capture a second indicia image data object using the near-field image sensor;
   decode the visual indicia in the second indicia image data object to identify delivery information represented by the visual indicia; and
   in response to successfully decoding the visual indicia in the second indicia image data object, output, for processing as a proof of delivery, the second indicia image data object as the proof of delivery captured using the near-field image sensor.

2. The apparatus of claim 1, wherein the apparatus comprises a plurality of image sensors comprising at least the near-field image sensor, the far-field image sensor, and an additional image sensor.

3. The apparatus of claim 1, wherein the processor is configured to output the delivery proof image data object, the delivery proof image data object and the first indicia image data object, or the combined data object to an external system for processing as the proof of delivery.

4. The apparatus of claim 1, the processor further configured to: receive user input indicating a request to begin capturing using at least the far-field image sensor, wherein the apparatus is configured to capture the first indicia image data object in response to receiving the user input.

5. The apparatus of claim 1, wherein, to output the delivery proof image data object, the delivery proof image data object and the first indicia image data object, or the combined data object, the processor is configured to:
   determine an active image output mode;
   in a circumstance where the active image output mode represents a combined image output mode:
   generate the combined data object based on at least the first indicia image data object and the delivery proof image data object; and
   output the combined data object; and
   in a circumstance where the active image output mode represents an individual image output mode:
   output at least the delivery proof image data object.

6. The apparatus of claim 1, the processor further configured to:
   cause a delivery status update in a delivery management system.

7. The apparatus of claim 1, wherein the delivery information comprises destination location data, and wherein the apparatus is further caused to:
   validate that the destination location data matches current location data based at least in part on a delivery path.

8. The apparatus of claim 1, wherein the apparatus is a handheld mobile scanner.

9. The apparatus of claim 1, wherein the visual indicia is associated with a delivered object, and wherein the delivery proof image data object comprises data representing at least one feature of an environment associated with the delivered object.

10. The apparatus of claim 1, the apparatus further caused to:
    cause storing, in a delivery management system, of the delivery proof image data object with a data record identified using the delivery information decoded from the visual indicia.

11. The apparatus of claim 1, wherein the near field of view is associated with a first focal length and the far field of view is associated with a second focal length.

12. The apparatus of claim 1, wherein the near-field image sensor and the far-field image sensor are oriented along a shared axis.

13. The apparatus of claim 1, wherein the processor is configured to output the second indicia image data object to an external system for processing as the proof of delivery.

14. A computer-implemented method for proof of delivery, the computer-implemented method comprising:
    in a barcode scanning apparatus comprising a hand-holdable housing comprising a near-field image sensor and a far-field image sensor:
    capturing a first indicia image data object using a far-field image sensor associated with a far field of view, the first indicia image data object comprising a visual indicia;
    decoding the visual indicia to identify delivery information represented by the visual indicia;
    in response to successfully decoding the visual indicia in the first indicia image data object, activating the near-field image sensor;
    capturing a delivery proof image data object using the near-field image sensor associated with a near field of view, wherein the near field of view is broader than the far field of view, and wherein the broader field of view comprises the near field of view;
    outputting, for processing as a proof of delivery, the delivery proof image data object, the delivery proof image data object and the first indicia image data object, or a combined data object generated based at least on the delivery proof image data object and the first indicia image data object;
    in response to unsuccessfully decoding the visual indicia in the first indicia image data object, activating the near-field image sensor;
    capturing a second indicia image data object using the near-field image sensor;

decoding the visual indicia in the second indicia image data object to identify delivery information represented by the visual indicia; and in response to successfully decoding the visual indicia in the second indicia image data object, outputting, for processing as a proof of delivery, the second indicia image data object captured using the near-field image sensor.

15. The computer-implemented method of claim 14, wherein outputting the delivery proof image data object, the delivery proof image data object and the first indicia image data object, or the combined data object comprises outputting the delivery proof image data object, the delivery proof image data object and the first indicia image data object, or the combined data object to an external system for processing as the proof of delivery.

16. The computer-implemented method of claim 14, the method further comprising:
in the barcode scanning apparatus, receiving a user input indicating a request to begin capturing using at least the far-field image sensor, wherein capturing the first indicia image data object is in response to receiving the user input.

17. The computer-implemented method of claim 14, the method further comprising:
causing a delivery status update in a delivery management system.

18. A computer program product comprising at least one non-transitory computer-readable storage medium having computer program code thereon that, in execution with at least one processor, configures the computer program product for:
capturing a first indicia image data object using a far-field image sensor associated with a far field of view, the first indicia image data object comprising a visual indicia;
decoding the visual indicia to identify delivery information represented by the visual indicia;
in response to successfully decoding the visual indicia in the first indicia image data object, activating the near-field image sensor;
capturing a delivery proof image data object using the near-field image sensor associated with a near field of view, wherein the near field of view is broader than the far field of view, and wherein the broader field of view comprises the near field of view;
outputting, for processing as a proof of delivery, the delivery proof image data object, the delivery proof image data object and the first indicia image data object, or a combined data object generated based at least on the delivery proof image data object and the first indicia image data object;
in response to unsuccessfully decoding the visual indicia in the first indicia image data object, activating the near-field image sensor;
capturing a second indicia image data object using the near-field image sensor;
decoding the visual indicia in the second indicia image data object to identify delivery information represented by the visual indicia; and
in response to successfully decoding the visual indicia in the second indicia image data object, outputting, for processing as a proof of delivery, the second indicia image data object captured using the near-field image sensor.

19. The computer program product of claim 18, wherein outputting the delivery proof image data object, the delivery proof image data object and the first indicia image data object, or the combined data object comprises outputting the delivery proof image data object, the delivery proof image data object and the first indicia image data object, or the combined data object to an external system for processing as the proof of delivery.

20. The computer program product of claim 18, the computer program product further configured for:
causing a delivery status update in a delivery management system.

* * * * *